(12) United States Patent
Kuboki et al.

(10) Patent No.: US 9,057,916 B2
(45) Date of Patent: Jun. 16, 2015

(54) LIQUID CRYSTAL DISPLAY APPARATUS

(75) Inventors: Ken Kuboki, Osaka (JP); Akira Shibazaki, Osaka (JP); Satomi Hasegawa, Osaka (JP); Hiroshi Tsuchiya, Osaka (JP); Yusuke Nishihara, Osaka (JP); Taichi Sasaki, Osaka (JP); Seiji Tanuma, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 118 days.

(21) Appl. No.: 14/001,137

(22) PCT Filed: Feb. 20, 2012

(86) PCT No.: PCT/JP2012/053955
§ 371 (c)(1),
(2), (4) Date: Aug. 22, 2013

(87) PCT Pub. No.: WO2012/115033
PCT Pub. Date: Aug. 30, 2012

(65) Prior Publication Data
US 2013/0329148 A1 Dec. 12, 2013

(30) Foreign Application Priority Data
Feb. 25, 2011 (JP) .................. 2011-040265

(51) Int. Cl.
*G02F 1/1337* (2006.01)
*G02F 1/1343* (2006.01)

(52) U.S. Cl.
CPC .... *G02F 1/133753* (2013.01); *G02F 1/133707* (2013.01); *G02F 2001/133757* (2013.01)

(58) Field of Classification Search
CPC .............. G02F 1/133707; G02F 1/133753

USPC .................................. 349/129, 139
See application file for complete search history.

(56) References Cited

U.S. PATENT DOCUMENTS

| | | | | |
|---|---|---|---|---|
| 5,831,700 A * | 11/1998 | Li et al. | ........................... | 349/88 |
| 6,067,140 A * | 5/2000 | Woo et al. | ..................... | 349/129 |
| 8,525,965 B2 * | 9/2013 | Kim et al. | ..................... | 349/144 |
| 2003/0071952 A1 | 4/2003 | Yoshida et al. | | |
| 2012/0236238 A1* | 9/2012 | Kim et al. | ..................... | 349/123 |

FOREIGN PATENT DOCUMENTS

| JP | 2007-249243 A | 9/2007 |
|---|---|---|
| JP | 2008-197691 A | 8/2008 |
| JP | 2009-80197 A | 4/2009 |

OTHER PUBLICATIONS

International Search Report corresponding to PCT/JP2012/053955, dated May 1, 2012.

* cited by examiner

*Primary Examiner* — Dung Nguyen
(74) *Attorney, Agent, or Firm* — Lowe Hauptman & Ham, LLP

(57) ABSTRACT

In a liquid crystal display apparatus, an angle of orientation of a first extension orientation of a first slit is not greater than an angle of orientation of a first director orientation, an angle of orientation of a second extension orientation of a second slit is not smaller than an angle of orientation of a second director orientation, and a difference between the angle of orientation of the second extension orientation and the angle of orientation of the second director orientation is greater than a difference between the angle of orientation of the first extension orientation and the angle of orientation of the first director orientation.

18 Claims, 28 Drawing Sheets

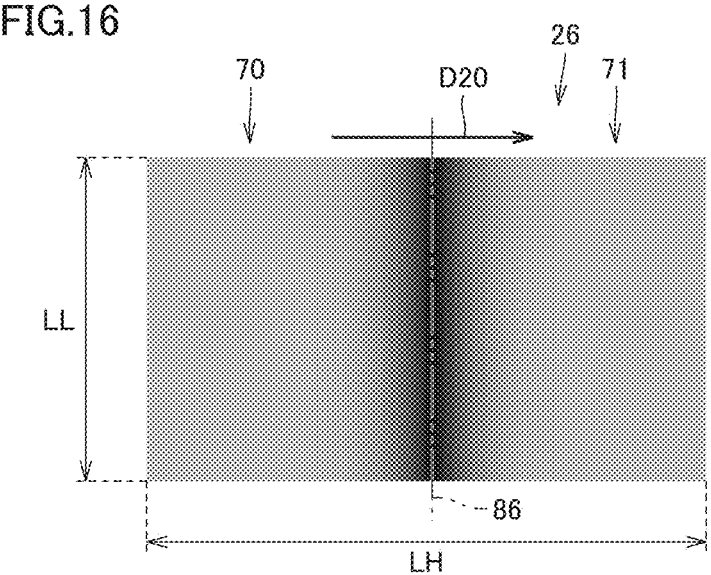
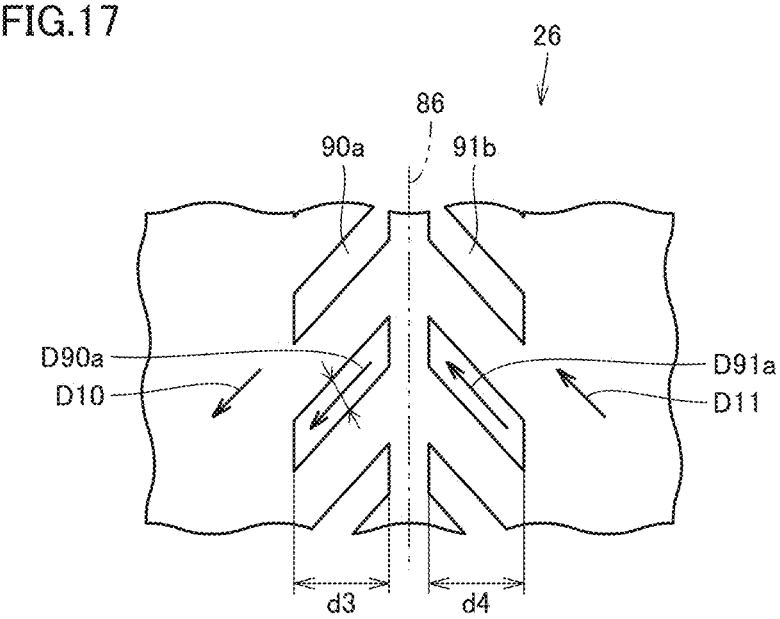

LIQUID CRYSTAL DISPLAY APPARATUS

RELATED APPLICATIONS

This application is a National Phase of International Application Number PCT/JP2012/053955 filed on Feb. 20, 2012, which is based upon and claims the benefit of priority from Japanese Patent Applications No. 2011-040265, filed on Feb. 25, 2011.

TECHNICAL FIELD

The present invention relates to a liquid crystal display apparatus and particularly to a liquid crystal display apparatus in which a plurality of domains are formed within a single pixel.

BACKGROUND ART

Various liquid crystal display apparatuses have conventionally been proposed, and particularly in recent years, various liquid crystal display apparatuses with focus being placed on improvement in a viewing angle, suppression of disclination, reduction in burn-in, and the like have been proposed.

For example, Japanese Patent Laying-Open No. 2007-249243 describes an RUN (Reverse Twisted Nematic) type liquid crystal display apparatus in which a plurality of domains are formed within a single pixel.

This RUN type liquid crystal display apparatus includes a pair of substrates, a plurality of domains formed within a single pixel, and domain restriction means for restricting a direction of leaning of a liquid crystal molecule in each domain.

In this Japanese Patent Laying-Open No. 2007-249243, a fish-bone-shaped electrode is exemplified as the domain restriction means.

By providing such domain restriction means, a direction of inclination of a liquid crystal molecule in each domain at the time of application of a voltage is each differed. By thus differing a direction of inclination of a liquid crystal molecule in each domain, a viewing angle is improved.

A liquid crystal display apparatus described in Japanese Patent Laying-Open No. 2008-197691 includes a domain formed within a single pixel and a perpendicular alignment film provided in a portion in contact with a liquid crystal layer.

The perpendicular alignment film has been subjected to an alignment process by emitting ultra violet (UV) rays from an oblique direction. Then, by differing a direction of emission of UV rays from place to place, a plurality of domains are formed. Then, this liquid crystal display apparatus includes a protruded bank such that liquid crystal molecules are aligned in an alignment restriction orientation for each domain at the time of application of a voltage.

A liquid crystal display apparatus described in Japanese Patent Laying-Open No. 2009-80197 includes a first substrate and a second substrate opposed to each other, a liquid crystal layer provided between the first substrate and the second substrate, a first electrode provided on the first electrode, and a second electrode provided on the second substrate.

Then, in this liquid crystal display apparatus as well, a plurality of domains are formed within a single pixel, and a slit is formed in at least one of the first electrode and the second electrode, in each domain. This slit is formed perpendicularly to an alignment orientation of liquid crystal molecules.

CITATION LIST

Patent Document

PTL 1: Japanese Patent Laying-Open No. 2007-249243
PTL 2: Japanese Patent Laying-Open No. 2008-197691
PTL 3: Japanese Patent Laying-Open No. 2009-80197

SUMMARY OF INVENTION

Technical Problem

In a liquid crystal display apparatus including a plurality of domains different in alignment orientation of liquid crystal molecules at the time of application of a voltage as above, a dark line appears in a boundary region between domains.

The present invention was made in view of the problems as described above, and an object thereof is to provide a liquid crystal display apparatus including a plurality of domains, in which occurrence of a dark line in a boundary region between domains is suppressed.

Solution to Problem

A liquid crystal display apparatus according to the present invention includes a liquid crystal layer containing a plurality of liquid crystal molecules, a first alignment film arranged to be adjacent to the liquid crystal layer, a first alignment region provided in the first alignment film, for aligning the liquid crystal molecules, and a second alignment region provided in the first alignment film and arranged to be adjacent to the first alignment region, for aligning the liquid crystal molecules. The liquid crystal display apparatus includes an electrode arranged opposite to the liquid crystal layer with respect to the first alignment film, a plurality of first slit portions formed in the electrode, opposed to a portion of the first alignment region adjacent to a boundary line between the first alignment region and the second alignment region, and extending in a direction away from the boundary line, and a plurality of second slit portions formed in the electrode, opposed to a portion of the second alignment region adjacent to the boundary line, and extending in a direction away from the boundary line. The liquid crystal display apparatus includes a second alignment film opposed to the first alignment film with the liquid crystal layer being interposed, a third alignment region provided in the second alignment film and opposed to the first alignment region, and a fourth alignment region provided in the second alignment film and opposed to the second alignment region.

The first alignment region and the third alignment region are formed such that liquid crystal molecules located in a central portion between the first alignment region and the third alignment region among the liquid crystal molecules are aligned in a first director orientation. The second alignment region and the fourth alignment region are formed such that liquid crystal molecules located in a central portion between the second alignment region and the fourth alignment region among the liquid crystal molecules are aligned in a second director orientation greater in angle of orientation than the first director orientation. With a direction toward the boundary line among directions of extension of the first slit portions being defined as a first extension orientation and a direction away from the boundary line among directions of extension of the second slit portions being defined as a second extension orientation, an angle of orientation of the first extension orientation is not greater than an angle of orientation of the first director orientation and an angle of orientation of the second extension orientation is not smaller than an angle of orientation of the second director orientation. A difference between the angle of orientation of the second extension orientation and the angle of orientation of the second director orientation is greater than a difference between the angle of orientation of the first extension orientation and the angle of orientation of the first director orientation.

Preferably, a distance between two end portions of the first slit portion laid out in the direction of extension of the first slit portion is shorter than a distance between two end portions of the second slit portion laid out in the direction of extension of the second slit portion. Preferably, the difference between the angle of orientation of the second extension orientation and the angle of orientation of the second director orientation is not smaller than 15° and smaller than 45°.

Preferably, an angle of intersection between the second slit portion and the boundary line is greater than 0° and not greater than 30°. Preferably, the angle of orientation of the first extension orientation and the angle of orientation of the first director orientation substantially match with each other.

In another aspect, a liquid crystal display apparatus according to the present invention includes a liquid crystal layer containing a plurality of liquid crystal molecules, a first alignment film arranged to be adjacent to the liquid crystal layer, a first alignment region provided in the first alignment film, for aligning the liquid crystal molecules, and a second alignment region provided in the first alignment film and arranged to be adjacent to the first alignment region, for aligning the liquid crystal molecules. The liquid crystal display apparatus includes an electrode arranged opposite to the liquid crystal layer with respect to the first alignment film, a first slit portion formed in the electrode so as to be opposed to a portion of the first alignment region adjacent to a boundary line between the first alignment region and the second alignment region, and extending in a direction away from the boundary line, and a second slit portion formed in the electrode so as to be opposed to a portion of the second alignment region adjacent to the boundary line, and extending in a direction away from the boundary line. The liquid crystal display apparatus includes a second alignment film opposed to the first alignment film with the liquid crystal layer being interposed, a third alignment region provided in the second alignment film and opposed to the first alignment region, and a fourth alignment region provided in the second alignment film and opposed to the second alignment region.

The first alignment region and the third alignment region are formed such that liquid crystal molecules located in a central portion between the first alignment region and the third alignment region among the liquid crystal molecules are aligned in a first director orientation. The second alignment region and the fourth alignment region are formed such that liquid crystal molecules located in a central portion between the second alignment region and the fourth alignment region among the liquid crystal molecules are aligned in a second director orientation greater in angle of orientation than the first director orientation. A distance between opposing end portions of the first slit portion laid out in a direction of extension of the first slit portion is shorter than a distance between opposing end portions of the second slit portion laid out in the direction of extension of the second slit portion. Preferably, a distance between the opposing end portions of the first slit portion laid out in the direction of extension of the first slit portion is greater than 0 μm and not greater than 7.5 μm.

Advantageous Effects of Invention

According to the liquid crystal display apparatus of the present invention, dark lines caused in a boundary region between domains can be decreased.

BRIEF DESCRIPTION OF DRAWINGS

FIG. 16 is a photograph showing a pixel of liquid crystal display apparatus 2 in which pixel electrode 26 shown in FIG. 15 has been adopted.

FIG. 17 is a plan view showing pixel electrode 26 having slits 90a, 91b formed.

FIG. 23 is a schematic diagram showing a state of inclination of liquid crystal molecules 80 located around slit 90a.

DESCRIPTION OF EMBODIMENTS

Figure 1:
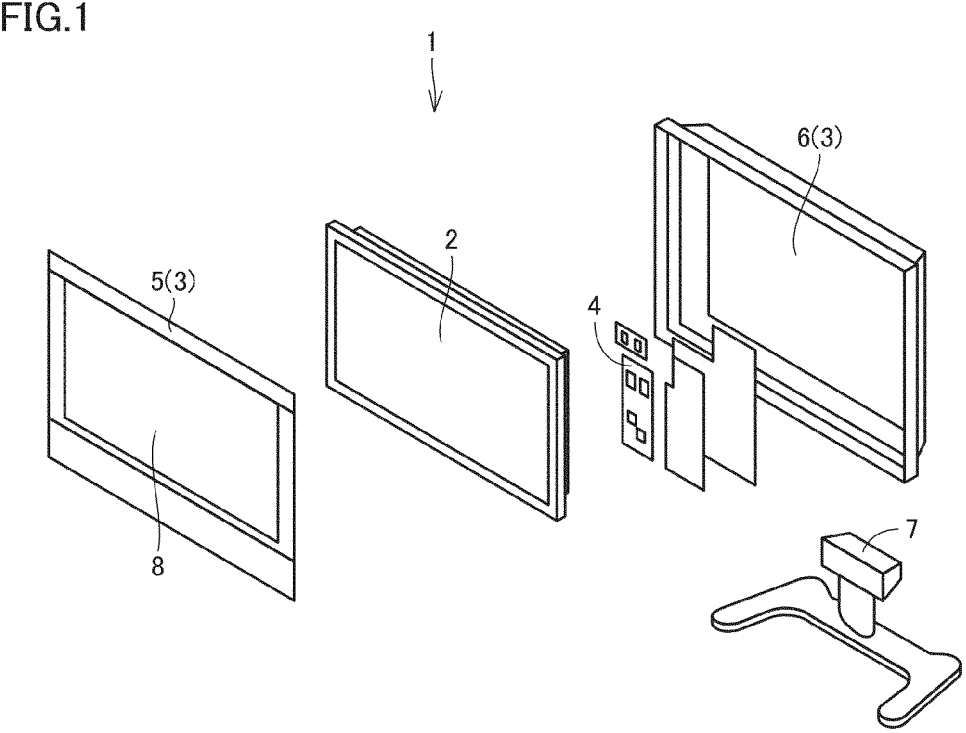
FIG. 1 is an exploded perspective view of a television receiver 1 incorporating a liquid crystal display apparatus according to the present embodiment.

A liquid crystal display apparatus 2 according to the present embodiment will be described with reference to FIGS. 1 to 43. FIG. 1 is an exploded perspective view of a television receiver 1 incorporating the liquid crystal display apparatus according to the present embodiment.

Television receiver 1 includes liquid crystal display apparatus 2, a housing 3 accommodating liquid crystal display apparatus 2, and a control unit 4 for controlling drive of liquid crystal display apparatus 2.

Housing 3 includes a front panel 5 arranged on a front surface side of liquid crystal display apparatus 2, a back surface case 6 arranged on a back surface side of liquid crystal display apparatus 2, and a base 7 supporting back surface case 6. A window portion 8 for externally exposing a screen of liquid crystal display apparatus 2 is formed in front panel 5, and front panel 5 is formed in a frame shape.

Figure 2:
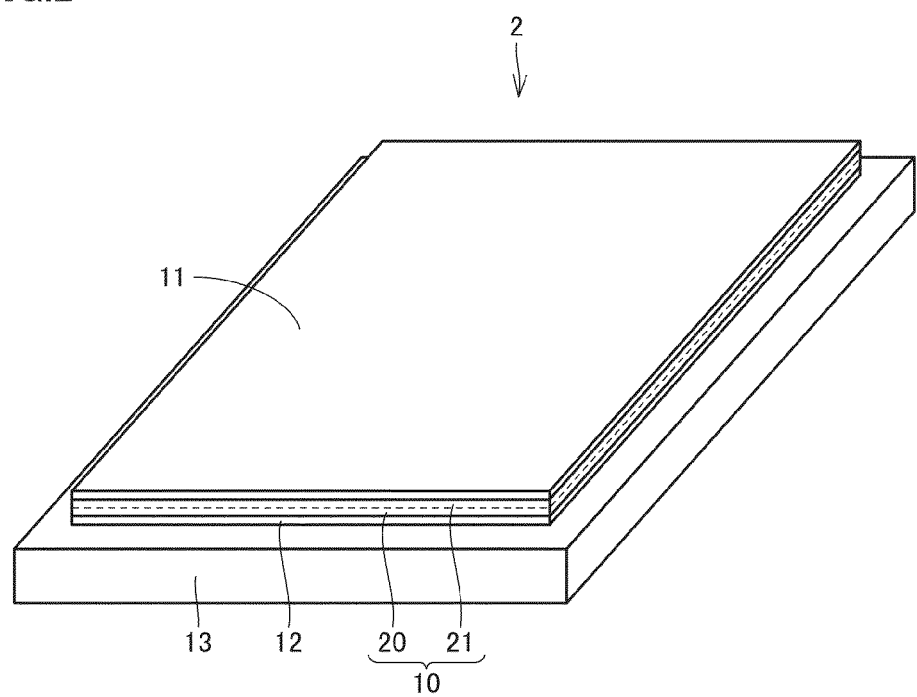
FIG. 2 is a perspective view schematically showing a liquid crystal display apparatus 2.

FIG. 2 is a perspective view schematically showing liquid crystal display apparatus 2. As shown in this FIG. 2, liquid crystal display apparatus 2 includes a liquid crystal display panel 10 formed in a plate shape, a polarizing plate 11 provided on one main surface of liquid crystal display panel 10, a polarizing plate 12 provided on the other main surface of liquid crystal display panel 10, and a backlight unit 13 emitting light toward liquid crystal display panel 10.

Polarizing plate 11 and polarizing plate 12 are arranged such that a direction of oscillation of light allowed to pass through polarizing plate 11 and a direction of oscillation of light allowed to pass through polarizing plate 12 are orthogonal to each other. Backlight unit 13 includes, for example, a light source having a plurality of Leeds, or the like.

Liquid crystal display panel 10 includes an active matrix substrate 20 arranged on a side of backlight unit 13 and an opposing substrate 21 arranged on active matrix substrate 20.

Figure 3:
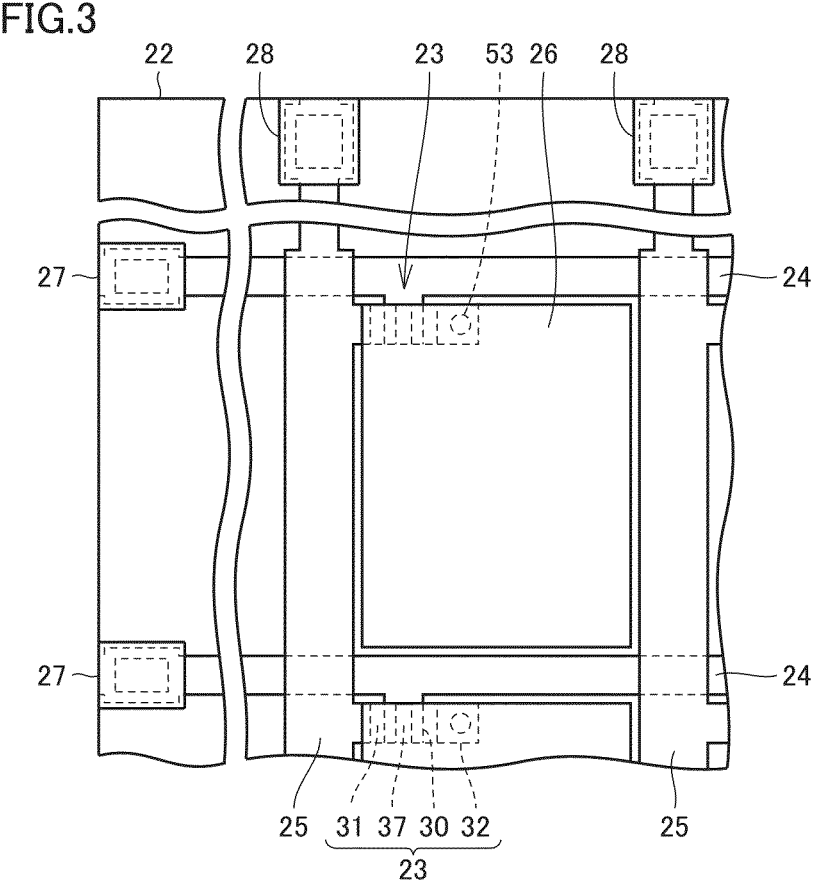
FIG. 3 is a plan view schematically showing a circuit formed in an active matrix substrate 20.

FIG. 3 is a plan view schematically showing a circuit formed in active matrix substrate 20. As shown in this FIG. 3, active matrix substrate 20 includes a transparent substrate 22, a plurality of switching elements 23 formed in an array on a main surface of this transparent substrate 22, a gate interconnection 24 connected to a gate electrode of switching element 23, a source interconnection 25 connected to a source electrode of switching element 23, and a pixel electrode 26 connected to a drain electrode of switching element 23. It is noted that an example where the invention of the present application is applied to a liquid crystal display apparatus is described in the present embodiment and hence a transparent substrate such as a glass substrate is adopted for transparent substrate 22.

Switching element 23 includes a gate electrode 30, a source electrode 31, and a drain electrode 32, and for example, a switching element such as an MIME (metal-insulator-metal) diode or a thin film transistor (TUFT) is adopted for switching element 23.

Gate interconnection 24 is formed in a first direction in an elongated manner and a plurality of gate interconnections 24 are formed at a distance from one another in a second direction orthogonal to the first direction. One end portion of gate interconnection 24 is provided with a gate terminal portion 27.

Source interconnection 25 is formed in the second direction in an elongated manner, and a plurality of source interconnections 25 are formed at a distance from one another in the first direction. One end portion of source interconnection 25 is provided with a source terminal portion 28.

Gate terminal portions 27 are laid out along one side portion of transparent substrate 22, and source terminal portions 28 are laid out along one long side portion of transparent substrate 22. Then, a region surrounded by two adjacent gate interconnections 24 and two adjacent source interconnections 25 is referred to as one pixel.

Figure 4:
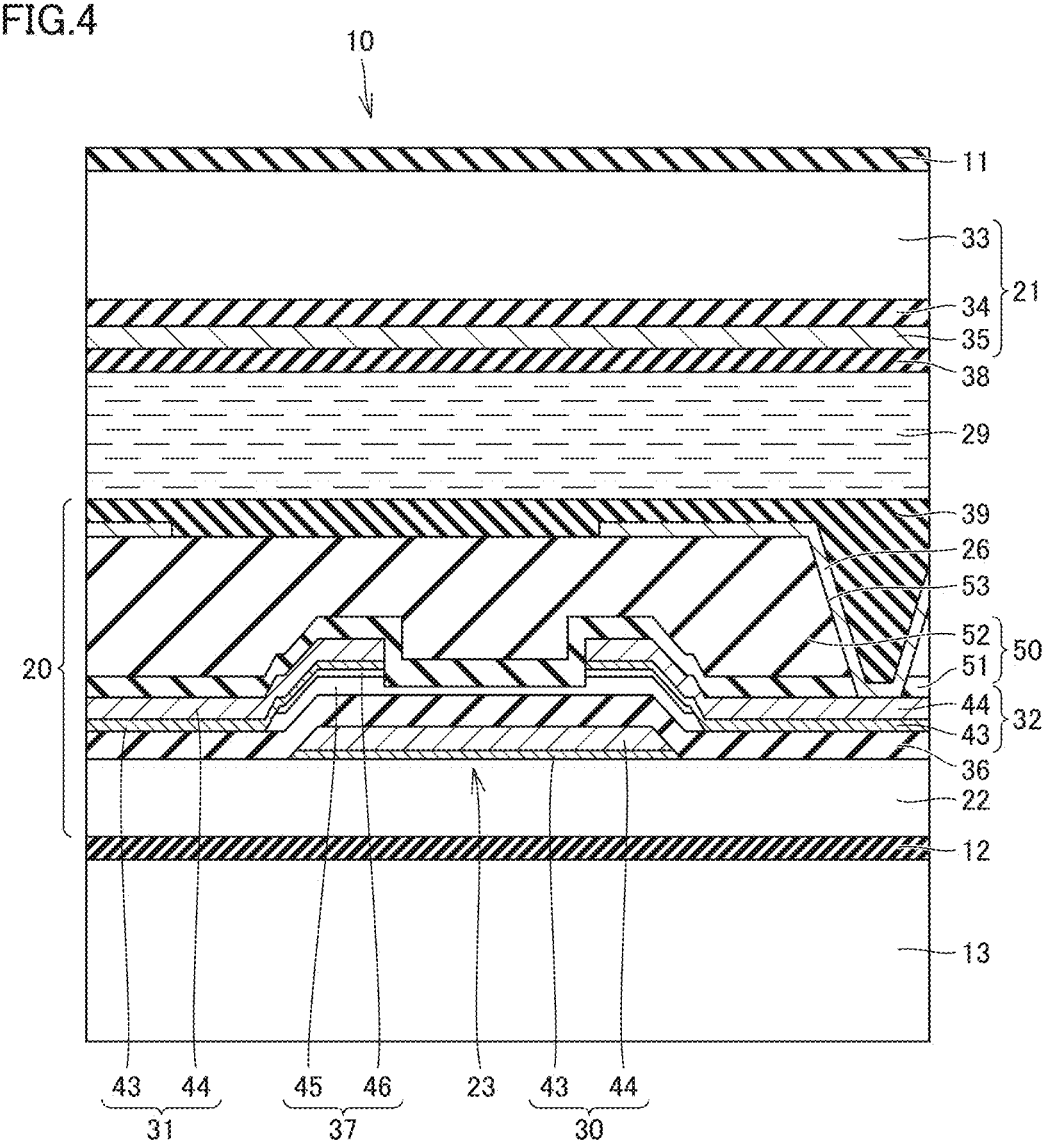
FIG. 4 is a cross-sectional view of a liquid crystal display panel 10 including a switching element 23.

FIG. 4 is a cross-sectional view of liquid crystal display panel 10 including switching element 23. As shown in this FIG. 4, liquid crystal display panel 10 includes active matrix substrate 20, opposing substrate 21 provided at a distance from active matrix substrate 20, a liquid crystal layer 29 provided between active matrix substrate 20 and opposing substrate 21 and serving as a display medium layer, an alignment film 39 provided on an upper surface of active matrix substrate 20, an alignment film 38 provided on a main surface of main surfaces of opposing substrate 21, which is opposed to active matrix substrate 20, polarizing plate 12 provided on transparent substrate 22, and polarizing plate 11 provided on a transparent substrate 33. It is noted that backlight unit 13 emits light toward active matrix substrate 20.

Opposing substrate 21 includes transparent substrate 33 such as a glass substrate, a color filter 34 provided on a main surface of transparent substrate 33, a common electrode 35 provided closer to active matrix substrate 20 than color filter 34, and alignment film 38 arranged closer to active matrix substrate 20 than common electrode 35.

Alignment film 38 is in contact with liquid crystal layer 29, and common electrode 35 is located opposite to liquid crystal layer 29, with respect to alignment film 38. Alignment film 38 is formed of an organic material having a photosensitive group.

Alignment film 38 has been subjected to an optical alignment process with the use of UV rays, and a plurality of fine protrusions of the picot order are formed on a surface of alignment film 38 on the side of liquid crystal layer 29. Specifically, the alignment film is formed such that a main chain of an alignment film polymer forming the alignment film is arranged on a surface of the substrate and a side chain stands in a substantially perpendicular direction.

Active matrix substrate 20 includes switching element 23 provided on the main surface of transparent substrate 22, an interlayer insulating film 50 provided to cover this switching element 23, pixel electrode 26 formed on an upper surface of interlayer insulating film 50, and alignment film 39 formed on this pixel electrode 26. Interlayer insulating film 50 includes a passivation film 51 and a planarizing film 52 formed on passivation film 51. Passivation film 51 is formed, for example, from an inorganic insulating film such as a silicon nitride film, and planarizing film 52 is formed, for example, from an organic insulating film of an acrylic resin or the like. Alignment film 39 is formed on interlayer insulating film 50 so as to cover pixel electrode 26. Alignment film 39 is adjacent to and in contact with liquid crystal layer 29. Alignment film 39 is formed of an organic material having a photosensitive group. Alignment film 39 has been subjected to an optical alignment process with the use of UV rays, and a plurality of fine protrusions of the picot order are formed on the surface of alignment film 39 in contact with liquid crystal layer 29. Specifically, the alignment film is formed such that a main chain of an alignment film polymer forming the alignment film is arranged on the surface of the substrate and a side chain stands in a substantially perpendicular direction. Pixel electrode 26 is arranged opposite to liquid crystal layer 29, with respect to alignment film 39. Pixel electrode 26 is formed from a transparent conductive film such as an ITO film or an AZO film. It is noted that a slit is formed in this pixel electrode 26 and details thereof will be described later.

Switching element 23 includes gate electrode 30 formed on the main surface of transparent substrate 22, a gate insulating film 36 formed on the main surface of transparent substrate 22 so as to cover this gate electrode 30, and a semiconductor layer 37 formed on an upper surface of gate insulating film 36 located on gate electrode 30. Switching element 23 includes source electrode 31 formed on semiconductor layer 37 and drain electrode 32 provided at a distance from source electrode 31.

Gate electrode 30 is formed from a stack metal film including a lower metal film 43 and an upper metal film 44 formed on an upper surface of this lower metal film 43. Similarly, source electrode 31 and drain electrode 32 are also formed from a stack metal film including lower metal film 43 and upper metal film 44, similarly to gate electrode 30.

For upper metal film 44 and lower metal film 43, for example, Cu (copper) can be adopted for upper metal film 44 and Ti (titanium) can be adopted for lower metal film 43.

Semiconductor layer 37 includes an amorphous silicon film 45 and an n+ amorphous silicon film 46 formed on this amorphous silicon film 45.

Source electrode 31 includes lower metal film 43 and upper metal film 44 formed on lower metal film 43. Drain electrode 32 includes lower metal film 43 and upper metal film 44 formed on this lower metal film 43.

A contact hole 53 is formed to reach an upper surface of drain electrode 32 in interlayer insulating film 50 and pixel electrode 26 is connected through this contact hole 53 to drain electrode 32.

Polarizing plate 12 is provided on the main surface located opposite to the main surface provided with switching element 23, of the two main surfaces of transparent substrate 22.

Polarizing plate 11 is arranged opposite to the main surface having color filter 34 formed, of the two main surfaces of transparent substrate 33. An absorption axis of polarizing plate 12 and an absorption axis of polarizing plate 11 are arranged to be orthogonal to each other.

Figure 5:
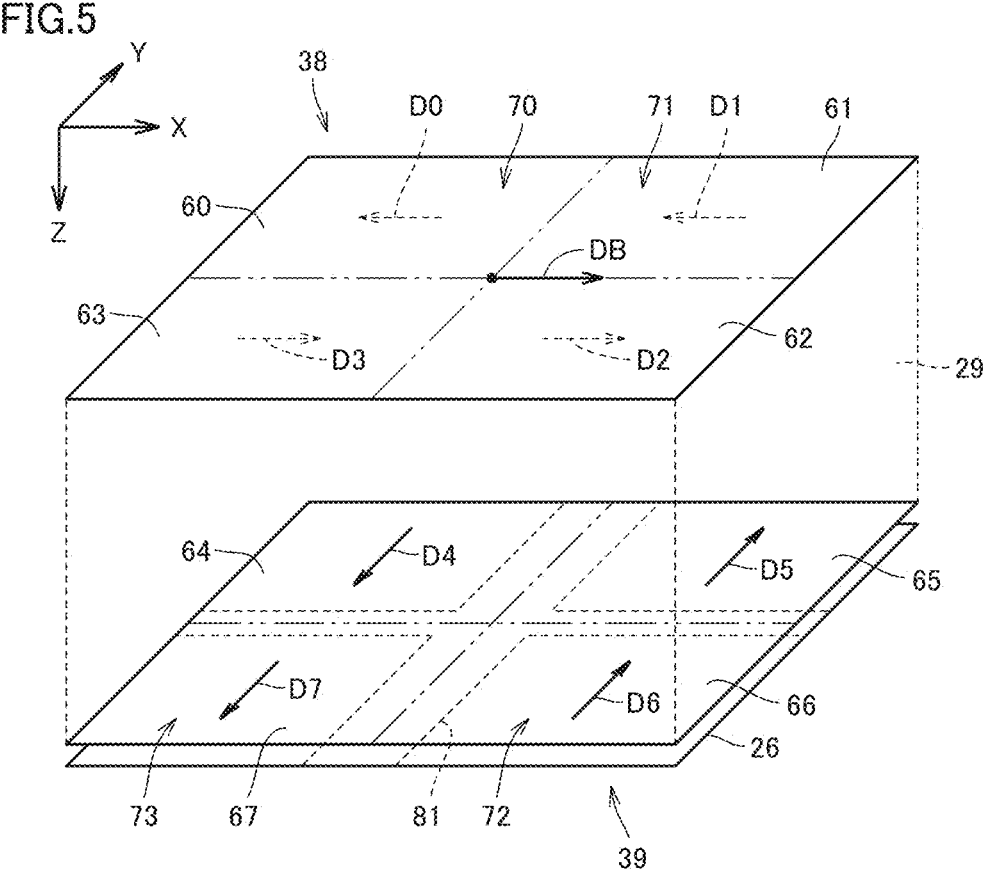
FIG. 5 is a perspective view showing a pixel electrode 26, a part of an alignment film 38, and a part of an alignment film 39.

FIG. 5 is a perspective view showing pixel electrode 26, a part of alignment film 38, and a part of alignment film 39. In this FIG. 5, a direction of a Z axis is a direction of observation at the time when an observer perpendicularly observes a screen.

Alignment film 38 includes a plurality of alignment regions 60 to 63. Alignment region 60 and alignment region 61 are adjacent in a direction of a line of an X axis, and alignment region 63 and alignment region 62 are arranged to be adjacent in the direction of the line of the X axis. It is noted that alignment region 60 and alignment region 63 are arranged to be adjacent in a direction of a line of a Y axis, and alignment region 61 and alignment region 62 are arranged to be adjacent in the direction of the line of the Y axis.

It is noted that alignment regions 60 to 63 have been subjected to an optical alignment process such that liquid crystal molecules within liquid crystal layer 29 are aligned in a prescribed direction, and alignment orientations of alignment regions 60, 61, 62, 63 are defined as alignment orientations (alignment restriction orientations) D0, D1, D2, D3, respectively. Here, each alignment orientation D0, D1, D2, D3 is defined by a side chain formed in alignment region 60, 61, 62, 63 and protruding from alignment region 60, 61, 62, 63. Specifically, a side chain protruding from alignment region 60 is inclined toward alignment orientation D0, from alignment region 60 toward alignment region 64. Similarly, a side chain formed in alignment region 61 is inclined toward alignment orientation D1, from alignment region 61 toward an alignment region 65. In addition, side chains formed in alignment regions 62, 63 are inclined toward alignment orientations D2, D3, from alignment regions 62, 63 toward alignment regions 66, 67, respectively.

An angle of orientation of each alignment orientation D0, D1, D2, D3 is set, with a reference orientation DB serving as the reference. Specifically, in a state where an observer observes a screen straight from the front, an orientation at 3 o'clock is defined as reference orientation DB. Then, an angle in a counterclockwise direction with respect to reference orientation DB is defined as an angle of orientation of each alignment orientation D0, D1, D2, D3. In the example shown in this FIG. 5, an angle of orientation of alignment orientation D0, D1 is 180°. In addition, an angle of orientation of alignment orientation D2, D3 is 0°. Alignment orientation D0 and alignment orientation D1 are the same orientation, and alignment orientation D2 and alignment orientation D3 are the same orientation.

Alignment film 39 includes alignment regions 64 to 67. Alignment region 64 is opposed to alignment region 60, and alignment region 65 is opposed to alignment region 61. Alignment region 66 is opposed to alignment region 62, and alignment region 67 is opposed to alignment region 63.

Alignment regions 64 to 67 have been subjected to an optical alignment process such that liquid crystal molecules within liquid crystal layer 29 are aligned in a prescribed direction.

Alignment orientations of alignment regions 64, 65, 66, 67 are defined as alignment orientations D4, D5, D6, D7, respectively. It is noted that side chains formed in alignment regions 64, 67 are inclined toward alignment orientations D4, D7, from alignment regions 64, 67 toward alignment regions 60, 63, respectively. Similarly, side chains formed in alignment regions 65, 66 are inclined toward alignment orientations D5, D6, from alignment regions 65, 66 toward alignment regions 61, 62, respectively. An angle of orientation of alignment orientation D4 and alignment orientation D7 is 270°, and an angle of orientation of alignment orientation D5 and alignment orientation D6 is 90°.

Then, alignment region 60 and alignment region 64 form a domain 70, and alignment region 61 and alignment region 65 form a domain 71. Similarly, alignment region 62 and alignment region 66 form a domain 72, and alignment region 63 and alignment region 67 form a domain 73.

Figure 6:
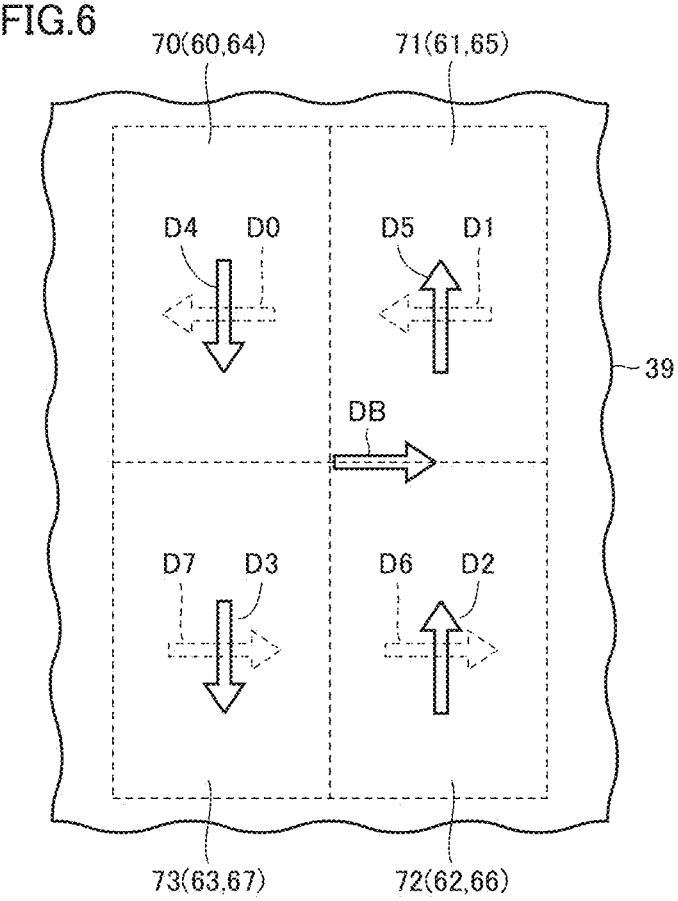
FIG. 6 is a plan view when alignment film 38 and alignment film 39 shown in FIG. 5 are viewed from above alignment film 38.
Figure 7:
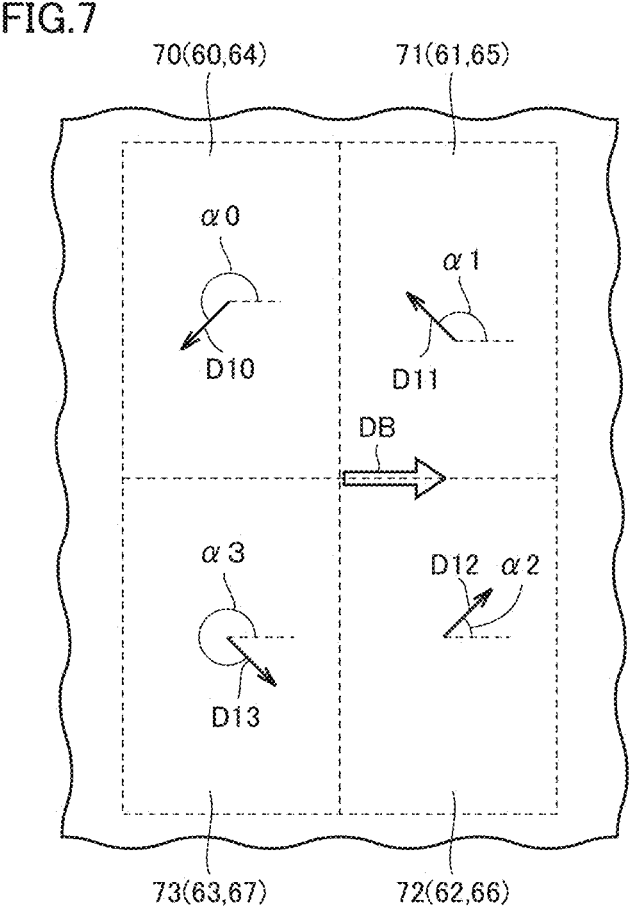
FIG. 7 is a plan view when alignment film 38 and alignment film 39 shown in FIG. 5 are viewed from above alignment film 38.

FIGS. 6 and 7 are plan views when alignment film 38 and alignment film 39 shown in FIG. 5 are viewed from above alignment film 38.

Here, in FIGS. 6 and 7, a director orientation of domain 70 is determined by alignment orientation D0 and alignment orientation D4, and as shown in FIG. 7, an angle of orientation $\alpha 0$ of director orientation D10 of domain 70 is set to 225°.

A director orientation D11 of domain 71 is defined by alignment orientation D1 and alignment orientation D5, and an angle of orientational $\alpha 1$ of director orientation D11 is 135°.

A director orientation D12 of domain 72 is defined by alignment orientation D2 and alignment orientation D6, and an angle of orientation $\alpha 2$ of director orientation D12 is 45°.

A director orientation D13 of domain 73 is defined by alignment orientation D3 and an alignment orientation D7, and an angle of orientation $\alpha 3$ of director orientation D13 is 315°.

The angles of orientation are set such that the angle of orientation of the director orientation increases in the order of domain 72, domain 71, domain 70, and domain 73. It is noted that an angle of orientation of each director orientation is set to an angle of counterclockwise rotation, with reference orientation DB serving as the reference.

As shown in FIG. 5, a plurality of domains 70 to 73 are formed above one pixel electrode 26. It is noted that, in the example shown in this FIG. 5, a 4-domain system in which 4 domains are provided is adopted.

Then, attention being paid to domain 73, a behavior of liquid crystal molecules in domain 73 in a non-application state where no voltage is applied across the pixel electrode and the common electrode and in a state where a voltage is applied will be described.

Figure 8:
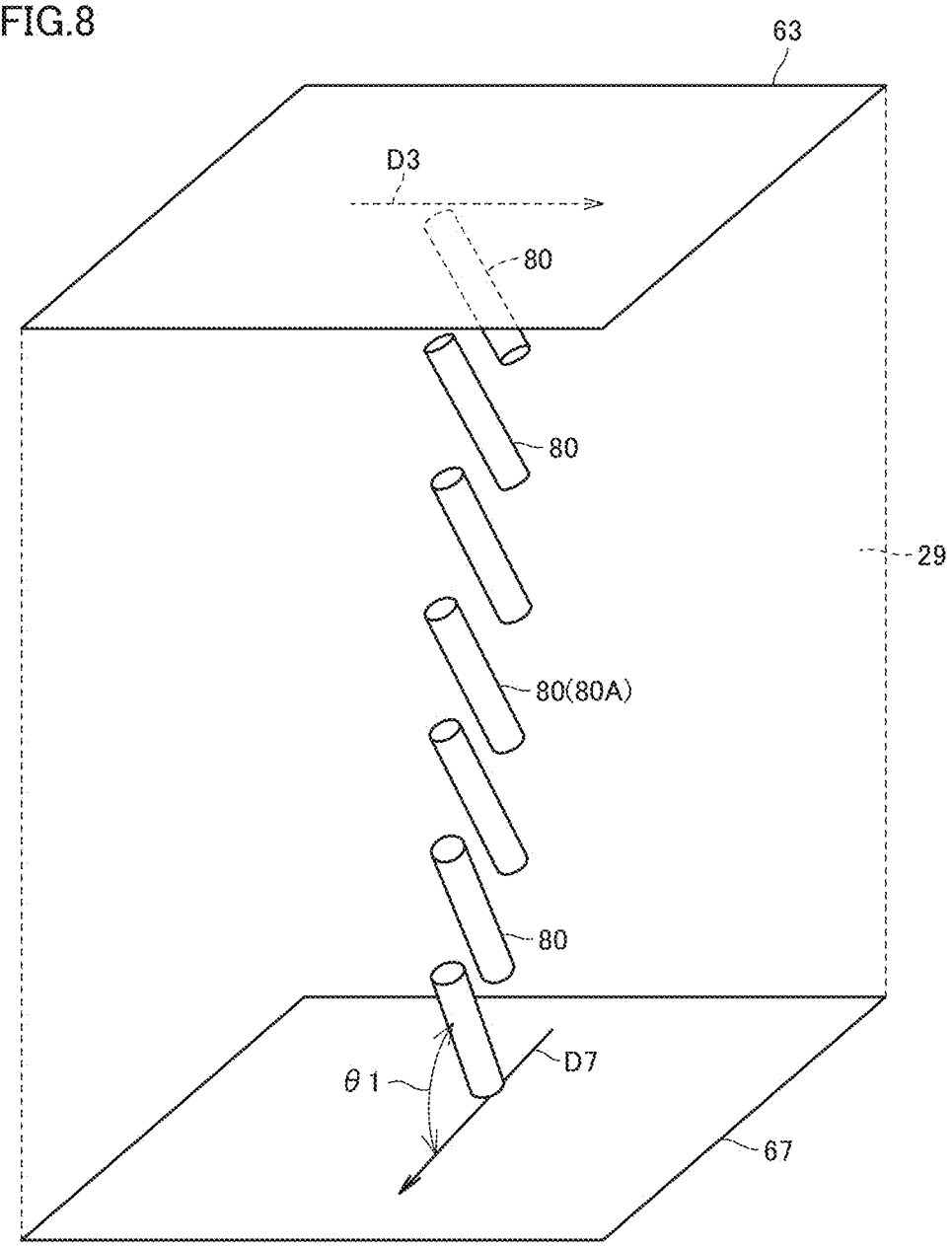
FIG. 8 is a perspective view showing an alignment region 63 and an alignment region 67, showing a state where no voltage is applied across a common electrode and a pixel electrode.

FIG. 8 is a perspective view showing alignment region 63 and alignment region 67, showing a state where no voltage is applied across the common electrode and the pixel electrode.

In FIG. 8, liquid crystal molecules 80 located in the vicinity of alignment region 67 are aligned in alignment orientation D7 by the side chains formed in alignment region 67. Then, a tilt angle of liquid crystal molecule 80 located on alignment region 67 is set to a pre-tilt angle $\theta 1$ of approximately 88.2°.

Then, liquid crystal molecules 80 located above are also laid out in accordance with liquid crystal molecule 80 located on alignment region 67.

Liquid crystal molecules 80A among liquid crystal molecules 80 located between alignment region 63 and alignment region 67 are located in a central portion between alignment region 63 and alignment region 67.

A tilt angle formed between this liquid crystal molecule 80A and alignment region 67 is set, for example, to around 88.2°.

As shown in this FIG. 8, in a state where no voltage is applied across the common electrode and the pixel electrode, liquid crystal molecules 80A are in a substantially erected state.

In FIG. 4, light from backlight unit 13 passes through a polarizing plate 12, passes through liquid crystal layer 29, color filter 34, and a polarizing plate 11, and is emitted to the outside.

Here, in the state where liquid crystal molecules 80 are erected as shown in FIG. 8, light incident through polarizing plate 12 is cut off by polarizing plate 11 without being polarized by liquid crystal layer 29. Namely, the liquid crystal display apparatus according to the present embodiment is a normally black type liquid crystal display apparatus.

Figure 9:
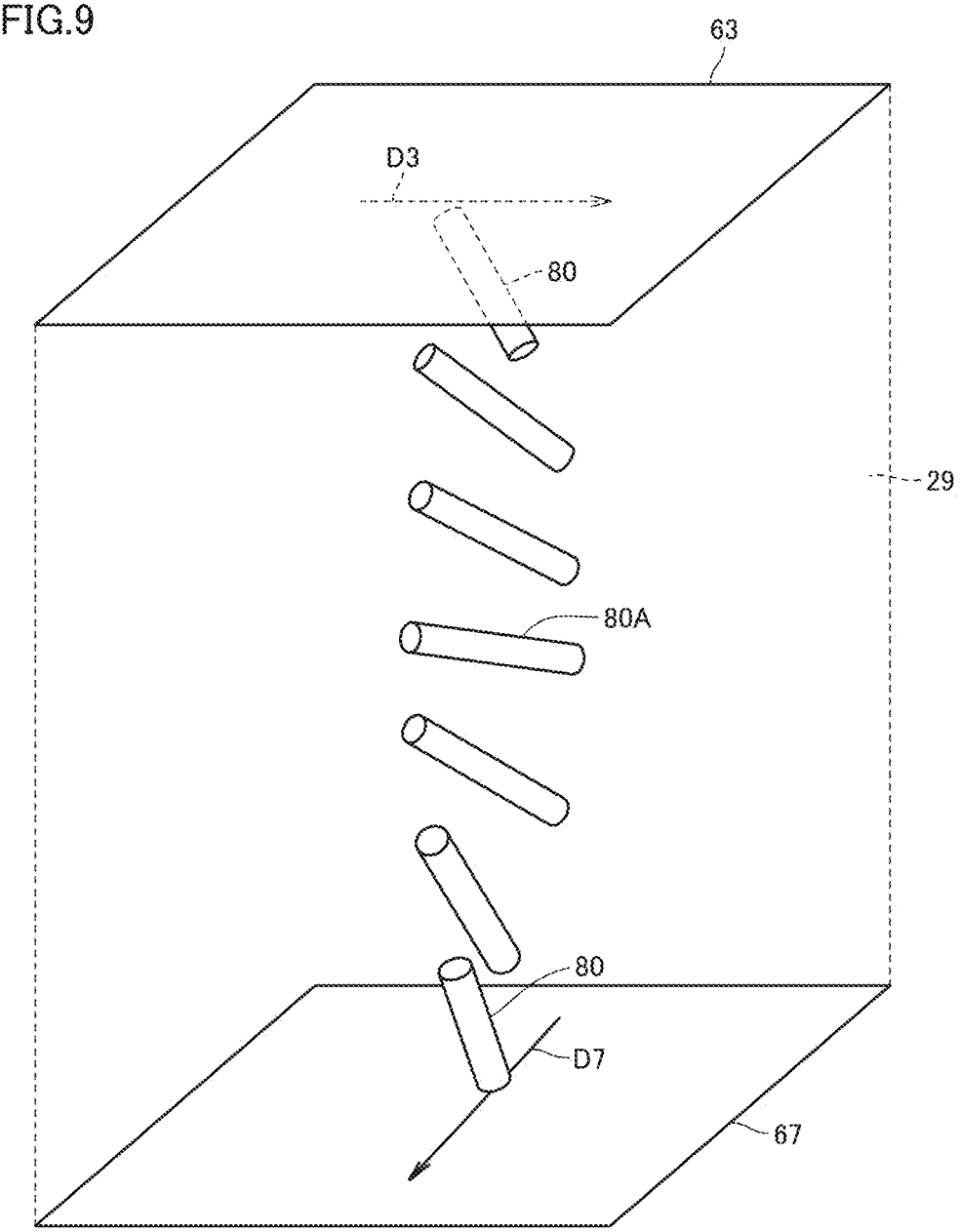
FIG. 9 is a perspective view showing alignment region 63 and alignment region 67, in a state where a voltage is applied across the common electrode and the pixel electrode.

FIG. 9 is a perspective view showing alignment region 63 and alignment region 67, and a perspective view in a state where a voltage is applied across the common electrode and the pixel electrode. As shown in this FIG. 9, liquid crystal molecules 80 are inclined in director orientation D13 shown in FIG. 7 above, as they are away from alignment region 63 and alignment region 67. Then, among liquid crystal molecules 80 located between alignment region 63 and alignment region 67, liquid crystal molecules 80A located in the central portion between alignment region 63 and alignment region 67 are aligned toward director orientation D13. It is noted that Table 1 below shows a "tilt angle (°)" and an "angle of orientation (°)" of each liquid crystal molecule in a state where a voltage is applied. It is noted that a "position in cell cross-section" indicates a distance from alignment region 67. The "tilt angle" is an angle formed between alignment region 67 and a liquid crystal molecule.

TABLE 1

| Position in Cell Cross-Section | Tilt Angle | Angle of Orientation |
| --- | --- | --- |
| 0 | 0 | 0 |
| 0.05 | 88.2 | −90 |
| 0.39 | 27.4574 | −50.0851 |
| 0.73 | 12.8723 | −48.9394 |
| 1.07 | 6.04389 | −47.7174 |
| 1.41 | 3.19756 | −46.5112 |
| 1.75 | 2.42779 | −45.314 |
| 2.09 | 3.22671 | −44.1282 |
| 2.43 | 6.11168 | −42.954 |
| 2.77 | 13.0014 | −41.7772 |
| 3.11 | 27.6854 | −40.6644 |
| 3.45 | 88.2 | 0 |
| 3.5 | 0 | 0 |

In such a state that a layout of liquid crystal molecules 80 is thus twisted, a direction of oscillation of light from backlight unit 13 is twisted while it travels from alignment region 67 to alignment region 63. Consequently, light from alignment region 63 to the outside passes through polarizing plate 11 shown in FIG. 4. Thus, in domain 73 formed by alignment region 67 and alignment region 63 in FIG. 7, liquid crystal molecules located in the central portion in a direction of thickness are aligned toward director orientation D13 by application of voltage.

Similarly, in FIG. 7, in domain 71, liquid crystal molecules located in the central portion between alignment region 61 and alignment region 65 are inclined toward director orientation D11.

In domain 72, liquid crystal molecules located in the central portion in a direction of thickness are inclined toward director orientation D12. In addition, in domain 73, liquid crystal molecules located in the central portion in a direction of thickness are inclined toward director orientation D13.

Thus, since a direction of inclination of liquid crystal molecules is different for each domain, variation in tone can be suppressed even when an observer views the screen in multiple directions.

Figure 10:
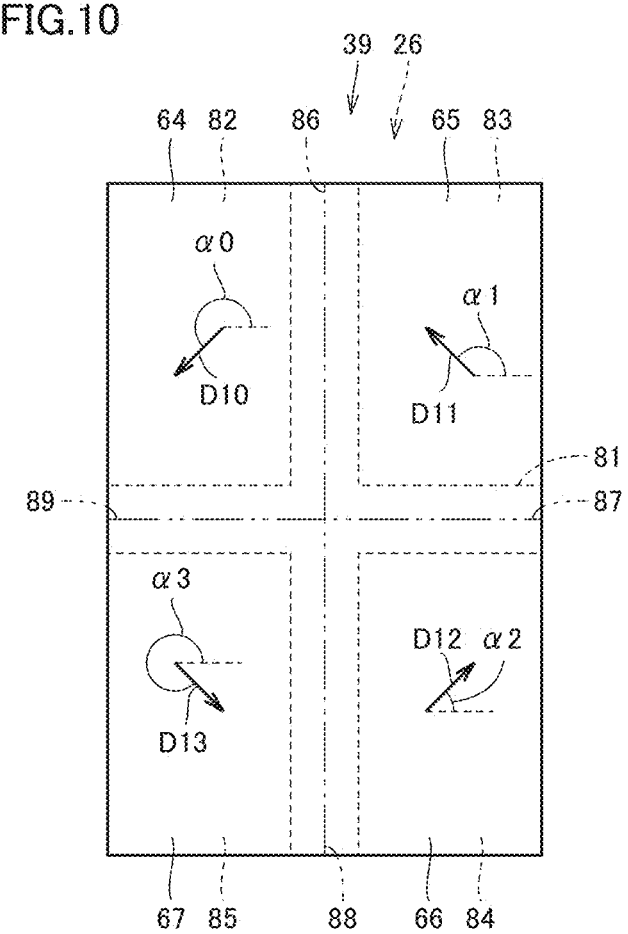
FIG. 10 is a plan view when pixel electrode 26 and alignment film 39 shown in FIG. 5 are two-dimensionally viewed from above alignment film 39.

FIG. 10 is a plan view when pixel electrode 26 and alignment film 39 shown in FIG. 5 are two-dimensionally viewed from above alignment film 39. In FIG. 10, a boundary portion between alignment region 64 and alignment region 65 is defined as a boundary line 86, and a boundary portion between alignment region 65 and alignment region 66 is defined as a boundary line 87. In addition, a boundary portion between alignment region 66 and alignment region 67 is defined as a boundary line 88. Furthermore, a boundary portion between alignment region 67 and alignment region 64 is defined as a boundary line 89.

Pixel electrode 26 includes a slit formation region 81 opposed to portions in alignment regions 64, 65, 66, 67, which are adjacent to boundary lines 86, 87, 88, 89, respectively, and extending in directions of extension of boundary lines 86, 87, 88, 89, and flat surface regions 82, 83, 84, 85 arranged to be adjacent to this slit formation region 81.

Figure 11:
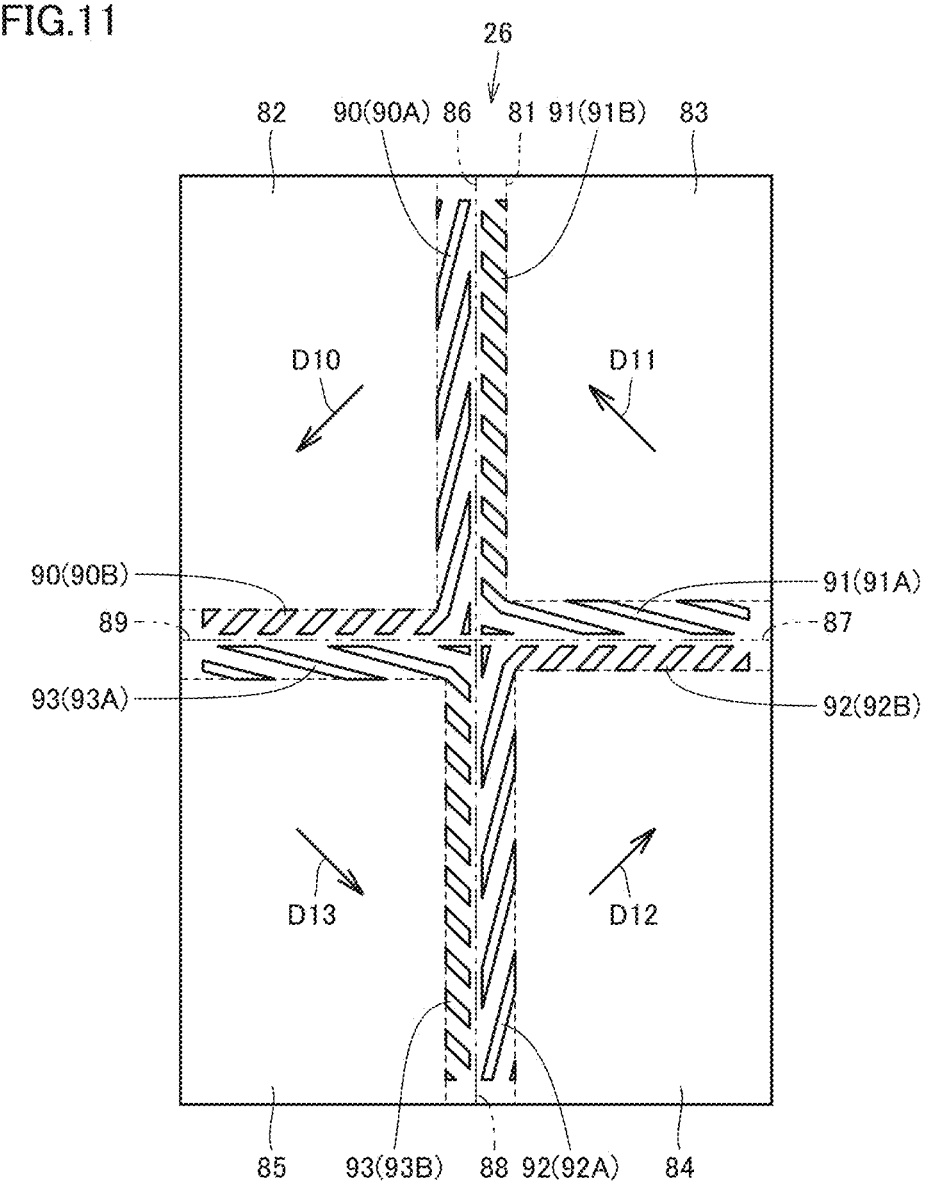
FIG. 11 is a plan view of pixel electrode 26.

FIG. 11 is a plan view of pixel electrode 26. As shown in this FIG. 11, a plurality of slits 90, 91, 92, 93 are formed in slit formation region 81.

Specifically, a plurality of slits 90 are formed in a portion of slit formation region 81 of pixel electrode 26, which is opposed to alignment region 64 shown in FIG. 10. A plurality of slits 91 are formed in a portion of slit formation region 81, which is opposed to alignment region 65 shown in FIG. 10.

A plurality of slits 92 are formed in a portion of slit formation region 81, which is opposed to alignment region 66 shown in FIG. 10. A plurality of slits 93 are formed in a portion of slit formation region 81, which is opposed to alignment region 67 shown in FIG. 10.

Slit 90 includes a plurality of slits 90A formed at a distance from each other along boundary line 86 and a plurality of slits 90B formed at a distance from each other along boundary line 89. Slit 91 includes a plurality of slits 91B formed at a distance from each other along boundary line 86 and a plurality of slits 91A formed at a distance from each other along boundary line 87. Slit 92 includes a plurality of slits 92B formed at a distance from each other along boundary line 87 and a plurality of slits 92A formed at a distance from each other along boundary line 88. Slit 93 includes a plurality of slits 93B formed at a distance from each other along boundary line 88 and a plurality of slits 93A formed at a distance from each other along boundary line 89.

It is noted that, in the example shown in this FIG. 11, slits 90A, 91A, 92A, 93A are formed to be in parallel to each other and slits 90B, 91B, 92B, 93B are formed to be in parallel to each other.

Flat surface regions 82, 83, 84, 85 have no slit formed and are formed in a flat surface shape.

Flat surface region 82 is arranged to be adjacent to a portion of slit formation region 81 where slits 90 are located, and flat surface region 83 is arranged to be adjacent to a portion of slit formation region 81 where slits 91 are located. Flat surface region 84 is arranged to be adjacent to a portion of slit formation region 81 where slits 92 are located. Flat surface region 85 is arranged to be adjacent to a portion of slit formation region 81 where slits 93 are located.

Figure 12:
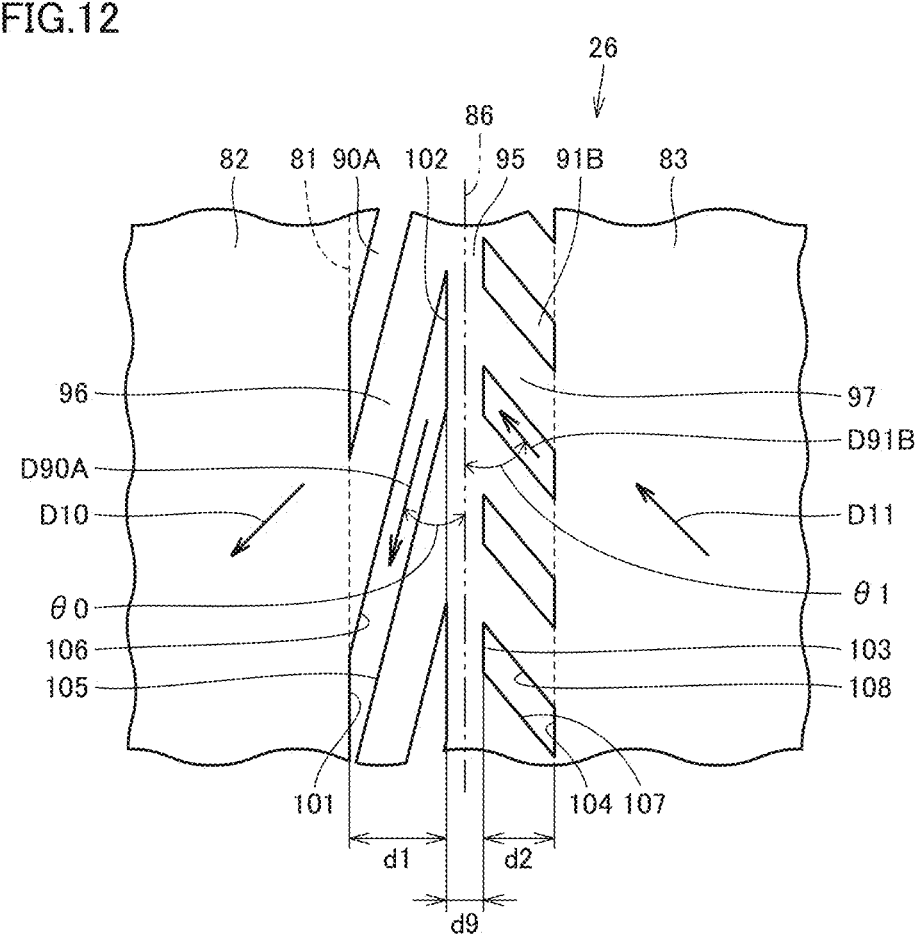
FIG. 12 is a plan view showing a slit 90A and a slit 91B and a portion located around the same.

FIG. 12 is a plan view showing slit 90A and slit 91B and a portion located around the same.

As shown in this FIG. 12, slit 90A and slit 91B are formed at a distance from each other with boundary line 86 lying therebetween, and a trunk portion 95 extending in a direction of extension of boundary line 86 is formed between slit 90A and slit 91B.

A plurality of slits 90A are formed at a distance from each other in the direction of extension of boundary line 86, and a branch portion 96 connecting trunk portion 95 and flat surface region 82 to each other is formed between slits 90A.

A plurality of slits 91B are also formed at a distance from each other in the direction of extension of boundary line 86, and a branch portion 97 connecting trunk portion 95 and flat surface region 83 to each other is formed between slits 91B.

When slit 90A and boundary line 86 are two-dimensionally viewed from above, an angle of intersection θ0 between a direction of extension of slit 90A and boundary line 86 is, for example, greater than 0° and not greater than 30°. Angle of intersection θ0 is smaller than an angle of intersection between director orientation D10 and boundary line 86.

A direction away from boundary line 86 among directions of extension of slits 90A is defined as an extension orientation (second extension orientation) 90A of slit 90A. An angle of orientation of extension orientation D90A is set to be not smaller than the angle of orientation of director orientation D10. The angle of orientation of director orientation D10 is set, for example, to 225°, and the angle of orientation of extension orientation D90A is not smaller than 225° and smaller than 270°. Therefore, a difference between the angle of orientation of extension orientation D90A and the angle of orientation of director orientation D10 is not smaller than 0° and smaller than 45°. In addition, a range not smaller than 15° and smaller than 45° is preferred.

Slit 90A is formed in a substantially parallelogrammatic shape, slit 90A includes short side portions 101, 102 laid out in the direction of extension of slit 90A as well as a lower side portion 105 and an upper side portion 106, short side portion 102 is located on a side of boundary line 86, and short side portion 101 is arranged at a position distant from boundary line 86.

A distance d1 between short side portion 101 and short side portion 102 is set, for example, to 12 μm. When slit 91B and boundary line 86 are two-dimensionally viewed from above, an angle of intersection θ1 between a direction of extension of slit 91B and boundary line 86 substantially matches with an angle of intersection between director orientation D11 and boundary line 86.

A direction toward boundary line 86 among directions of extension of slits 91B is defined as an extension orientation (first extension orientation) 91B of slit 91B. Extension orientation D91B and director orientation D11 are formed to substantially match with each other.

Thus, in liquid crystal display apparatus 2 according to the present embodiment, a plurality of domains different in director orientation D10, D11 are arranged adjacent to each other. Then, a difference in angle of orientation between director orientation D10 and extension orientation D90A of slit 90A opposed to a domain great in director orientation is formed to be greater than a difference in angle of orientation between director orientation D11 and extension orientation D91B of slit 91B opposed to a domain small in director orientation. In other words, angle of intersection θ0 is set to be smaller than angle of intersection θ1.

Slit 91B is formed in a substantially parallelogrammatic shape, and slit 91B includes a short side portion 103 proximate to boundary line 86, a short side portion 104 distant from boundary line 86, and a lower side portion 107 and an upper side portion 108.

A distance d2 between short side portion 103 and short side portion 104 is greater than 0 μm and not greater than 7.5 μm. Thus, distance d2 between end side portions of slit 91B is smaller than distance d1 between end side portions of slit 90A.

As is clear also from FIG. 12, an interval between slits 90A in the direction of extension of boundary line 86 is greater than an interval between slits 91B in the direction of extension of boundary line 86. It is noted that a width d9 of trunk portion 95 is set, for example, to approximately 4 μm.

Figure 13:
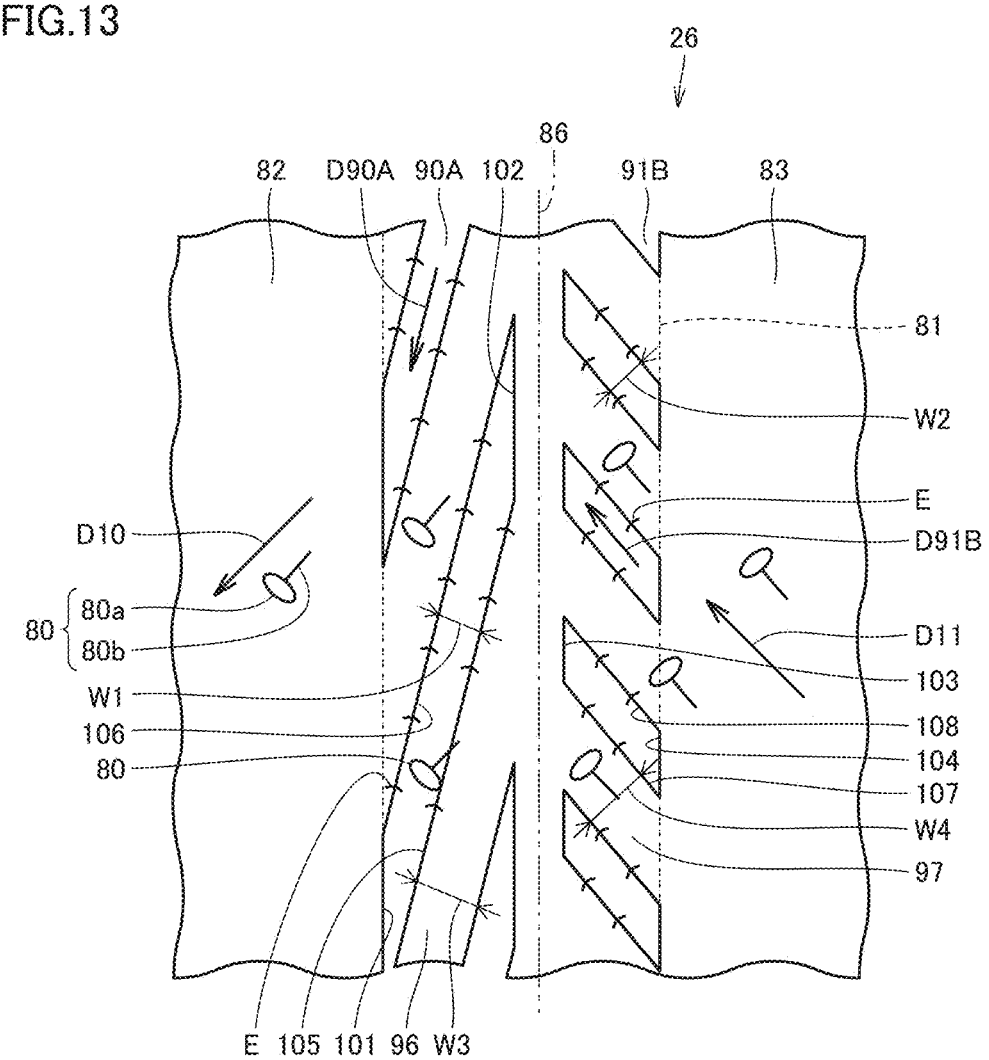
FIG. 13 is an enlarged plan view showing a part of FIG. 12 in an enlarged manner.

FIG. 13 is an enlarged plan view showing a part of FIG. 12 in an enlarged manner. In this FIG. 13, a width W1 of slit 90A is set, for example, to approximately 3 μm, and a width W2 of slit 91B is also set to approximately 3 μm. A width W3 of branch portion 96 is set, for example, to 4 μm, and a width W4 of branch portion 97 is also set, for example, to approximately 4 μm.

Thus, widths W3, W4 of respective branch portions 96, 97 are formed to be greater than widths W1, W2 of respective slits 90A, 91B.

In this FIG. 13, a voltage is applied to pixel electrode 26, and as shown in FIG. 9 above, liquid crystal molecules 80 in liquid crystal layer 29 are inclined in a prescribed orientation. Liquid crystal molecules 80 shown in FIG. 13 schematically represent liquid crystal molecules 80 located in the central portion in a direction of thickness of liquid crystal layer 29 among liquid crystal molecules 80 within liquid crystal layer 29.

An end portion 80a of schematically shown liquid crystal molecule 80 shows an end portion located on an observer side when the observer observes the screen. A shaft portion 80b of liquid crystal molecule 80 shows a body portion of liquid crystal molecule 80 in an oblong shape.

Figure 14:
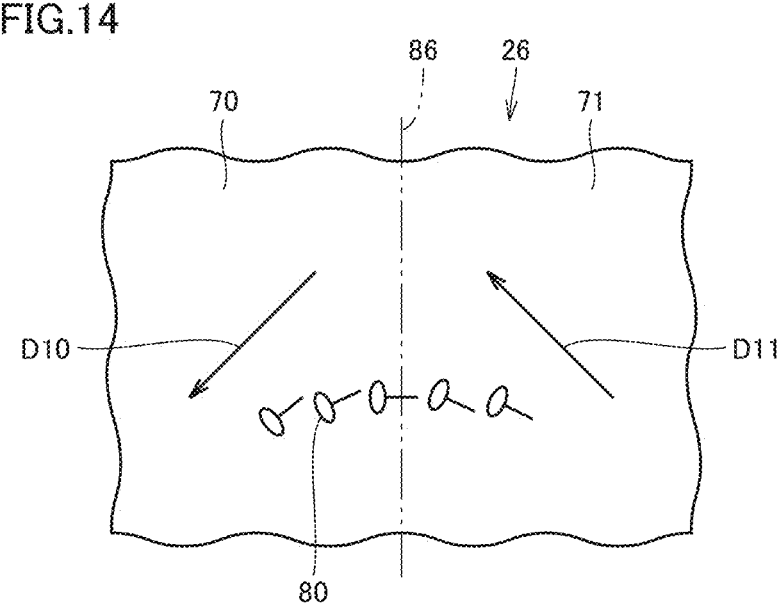
FIG. 14 is a plan view showing a comparative example in a case where no slit 90A, 91B is formed.

FIG. 14 is a plan view showing a comparative example in a case where no slit 90A, 91B is formed. It is noted that, in the example shown in this FIG. 14 as well, a prescribed potential is applied across pixel electrode 26 and the common electrode and liquid crystal molecules 80 shown in this FIG. 14 are also located in the central portion in the direction of thickness of the liquid crystal layer.

In this FIG. 14, when no slit 90A, 91B is formed in pixel electrode 26, an angle of orientation of liquid crystal molecules 80 is varied from director orientation D10 to director orientation D11, from the side of domain 70 toward the side of domain 71. The angle of orientation of the alignment orientation of liquid crystal molecule 80 located on the side of domain 70, among liquid crystal molecules 80 located on the boundary region between domain 70 and domain 71, is smaller than the angle of orientation of director orientation D10. This is because the angle of orientation of director orientation D11 of domain 71 is smaller than the angle of orientation of director orientation D10 of domain 70.

Then, the angle of orientation of the alignment orientation of liquid crystal molecule 80 located on the side of domain 71, among liquid crystal molecules 80 located on the boundary region between domain 70 and domain 71, is greater than the angle of orientation of director orientation D11.

Consequently, in the boundary region between domain 70 and domain 71, liquid crystal molecules 80 are not oriented in a prescribed orientation, which becomes the cause for occurrence of a dark line.

On the other hand, in the liquid crystal display apparatus according to the present embodiment, slits 90A, 91B are formed so that disturbance of orientations of liquid crystal molecules 80 can be suppressed also in a region located in the boundary portion between domain 70 and domain 71. The principles thereof will be described with reference to FIG. 13 above.

As shown in FIG. 13, when a prescribed potential is applied to pixel electrode 26, electric field E is generated between slit 90A and branch portion 96.

A direction of electric field E is perpendicular to a peripheral portion of slit 90A and the electric field distributes along an edge portion of slit 90A and branch portion 96. Thus, positions of liquid crystal molecules 80 located on slit 90A and on branch portion 96 are corrected.

Here, in a case where no slit 90A is formed, the alignment orientation of liquid crystal molecule 80 located on the side of flat surface region 82 in slit formation region 81 is smaller than director orientation D10. On the other hand, in liquid crystal display apparatus 2 according to the present embodiment, the angle of orientation of extension orientation D90A of slit 90A is not smaller than the angle of orientation of director orientation D10. Therefore, liquid crystal molecules 80 located on slit 90A and branch portion 96 are corrected such that the alignment orientation thereof is greater.

Consequently, the alignment orientations of liquid crystal molecules 80 located on slit 90A and branch portion 96 approximate to director orientation.

Here, as a potential is applied to pixel electrode 26 in FIG. 13, electric field is generated also between slit 91B and branch portion 97.

Consequently, positions of liquid crystal molecules 80 located on slit 91B and branch portion 97 are also corrected by the electric field.

The angle of orientation of extension orientation D91B of slit 91B is not greater than the angle of orientation of director orientation D11.

It is noted that, in a case where no slit 91B is formed, the angle of orientation of liquid crystal molecule 80 located on the side of domain 71 in slit formation region 81 is greater than the angle of orientation of director orientation D11.

On the other hand, since the angle of orientation of extension orientation D91B of slit 91B is not greater than the angle of orientation of director orientation D11, liquid crystal molecules 80 located on slit 91B and branch portion 97 are corrected such that the angle of orientation thereof is smaller.

Consequently, the orientations of liquid crystal molecules 80 located on slit 91B and branch portion 97 approximate to director orientation.

Here, the reason why an angle of orientation of extension orientation D90A, D91B or angle of intersection θ0, θ1 is set as described above as shown in FIG. 13 will be described with reference to FIGS. 15 to 36 below.

Figure 15:
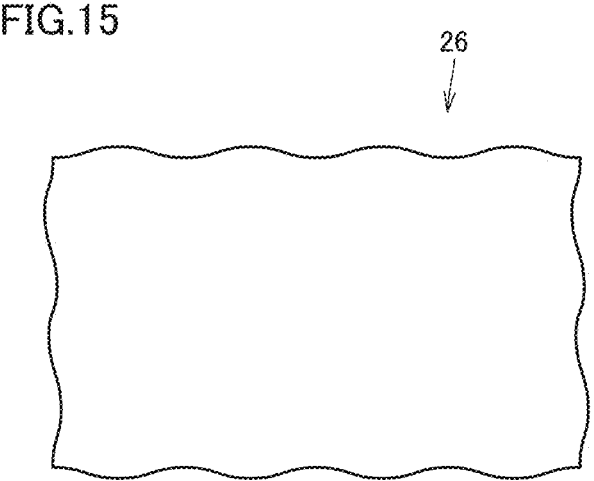
FIG. 15 is a plan view showing pixel electrode 26 having no slit formed.

FIG. 15 shows pixel electrode 26 having no slit formed, and FIG. 16 is a photograph showing a pixel of liquid crystal display apparatus 2 in which pixel electrode 26 shown in FIG. 15 has been adopted.

Specifically, a manner when a part of a pixel in which pixel electrode 26 is adopted is observed from a side of opposing substrate 21 in liquid crystal display apparatus 2 in which pixel electrode 26 shown in FIG. 15 has been adopted is shown. In particular, the observed region is such that boundary line 86 is located in the center, a length LH in a direction perpendicular to boundary line 86 is 100 μm, and a length LL in a direction of extension along boundary line 86 is 45 μm.

As shown in this FIG. 16, it can be seen that a dark line is caused on boundary line 86 in a pixel where pixel electrode 26 having no slit formed has been adopted.

Figure 18:
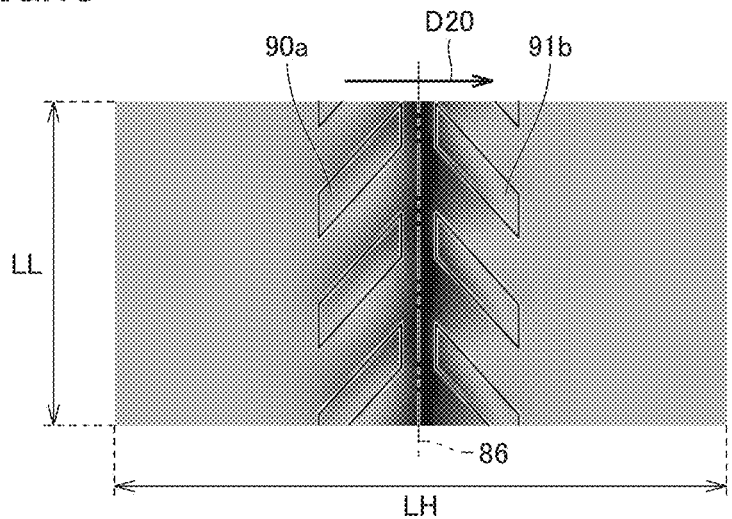
FIG. 18 is a plan view when a part of the pixel in which pixel electrode 26 shown in FIG. 17 has been adopted is observed from a side of an opposing substrate 21.

FIG. 17 is a plan view showing pixel electrode 26 having slits 90a, 91b formed. FIG. 18 is a plan view when a part of the pixel in which pixel electrode 26 shown in FIG. 17 has been adopted is observed from a side of opposing substrate 21. An angle of intersection between slit 90a and boundary line 86 shown in FIG. 17 is 45° and an angle of intersection between slit 91b and boundary line 86 is 45°. In other words, an angle of orientation of an extension orientation D90a of slit 90a is 225° and an extension orientation D91a of slit 91b is 135°. In addition, a distance d3 between short side portions of slit 90a is 8.5 μm and a distance d4 between short side portions of slit 91b is also 8.5 μm.

In FIG. 18 as well, length LH is 100 μm and length LL is 45 μm. As shown in this FIG. 18, a dark line formed on boundary line 86 is smaller in thickness than the dark line formed on boundary line 86 in FIG. 16. On the other hand, it can be seen that a dark line extends along slit 91b and a portion low in light transmittance is generated also on a side of slit 90a.

Figure 19:
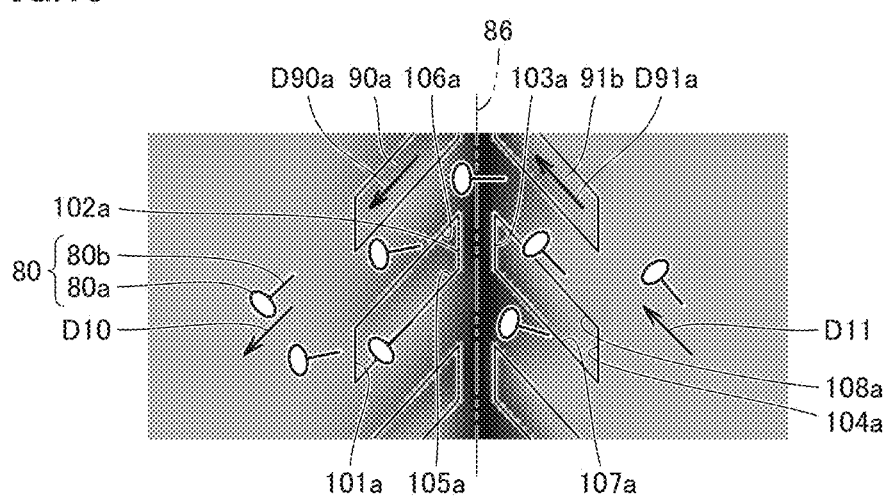
FIG. 19 is a plan view showing a part of FIG. 18 in an enlarged manner.

FIG. 19 is a plan view showing a part of FIG. 18 in an enlarged manner. It is noted that, in this FIG. 19, a voltage is applied across pixel electrode 26 and the opposing electrode, and liquid crystal molecules 80 shown in FIG. 19 schematically represent liquid crystal molecules 80 located in the central portion in the direction of thickness of the liquid crystal layer.

As shown in this FIG. 19, slit 90a includes a short side portion 101a, a short side portion 102a, an upper side portion 106a, and a lower side portion 105a. In addition, slit 91b includes a short side portion 103a, a short side portion 104a, an upper side portion 108a, and a lower side portion 107a.

It is noted that extension orientation D90a of slit 90a is 225° and extension orientation D91a of slit 91b is 135°. A behavior of liquid crystal molecules 80 at the time when a voltage is applied to this pixel electrode 26 will be described. Alignment restriction force from alignment film 39, load applied across liquid crystal molecules 80 adjacent in a direction of a main surface of alignment film 39, and force from electric field formed around the slit of pixel electrode 26 are applied to liquid crystal molecules 80, and an alignment orientation of liquid crystal molecules 80 is determined by total external force.

Figure 20:
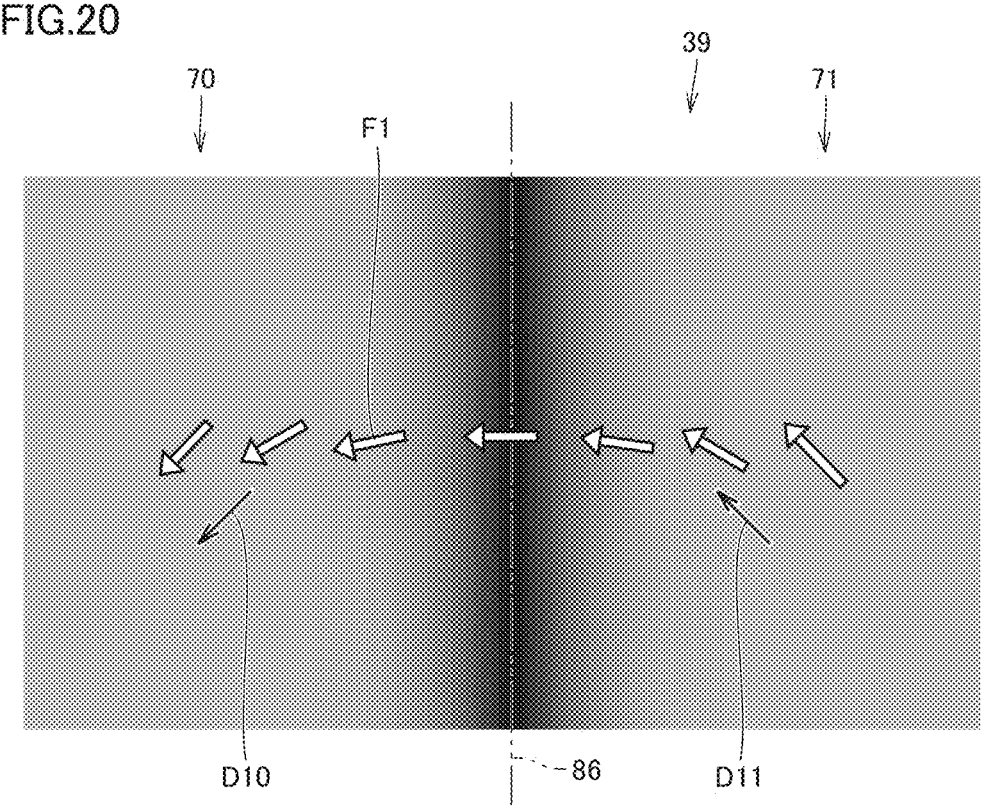
FIG. 20 is a photograph schematically showing distribution of resultant force F1 of alignment restriction force applied from alignment film 39 to liquid crystal molecules and load applied from liquid crystal molecules 80 adjacent in a direction of a main surface of alignment film 39.

FIG. 20 schematically shows distribution of resultant force F1 of alignment restriction force applied from alignment film 39 to liquid crystal molecules and load applied from liquid crystal molecules 80 adjacent in the direction of the main surface of alignment film 39. Director orientation D10 of domain 70 is different from director orientation D11 of domain 71. Therefore, at a position in domain 70, 71 distant from boundary line 86, resultant force F1 is in substantially the same orientation as director orientation D10, D11.

On the other hand, toward boundary line 86, a vector of resultant force F1 is closer to an average of director orientation D10 and director orientation D11.

Figure 21:
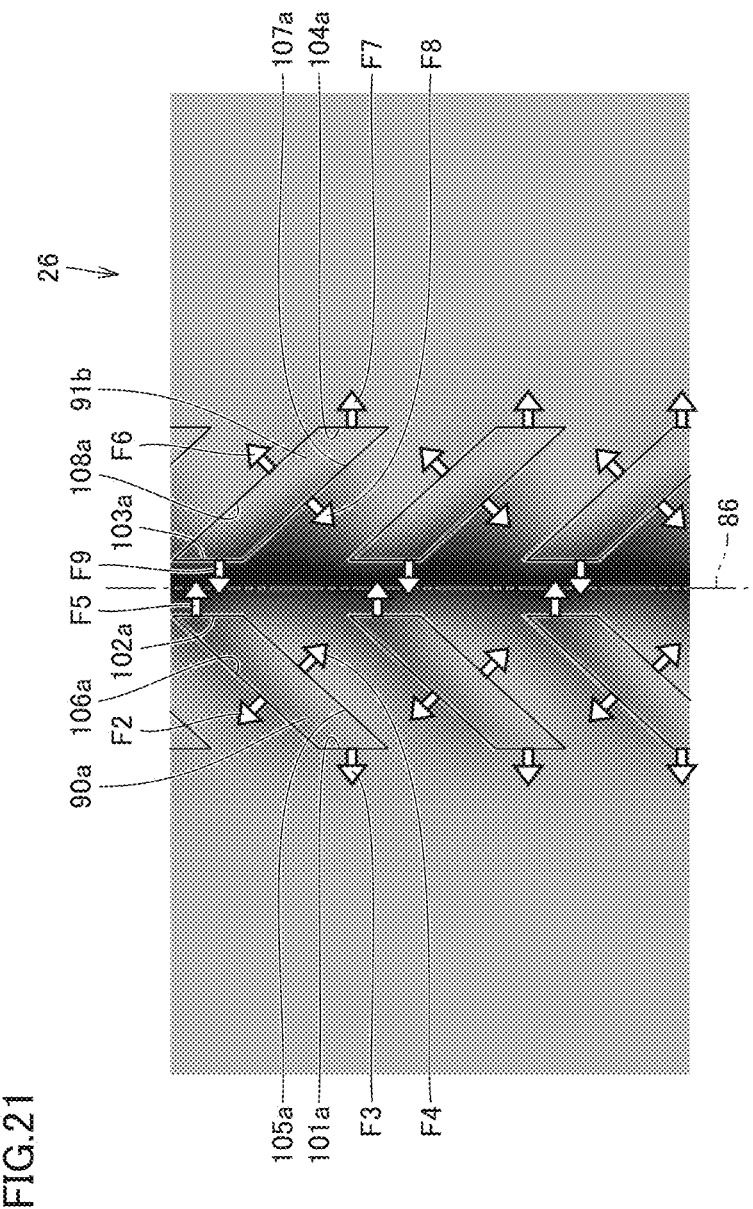
FIG. 21 is a photograph schematically showing distribution of external force applied to liquid crystal molecules 80 from electric field formed around slit 90a and slit 91b.

Then, external force applied to liquid crystal molecules 80 from electric field formed around slit 90a and slit 91b will be discussed. FIG. 21 is a photograph schematically showing distribution of external force applied to liquid crystal molecules 80 from electric field formed around slit 90a and slit 91b.

In this FIG. 21, when a voltage is applied to pixel electrode 26, in short side portions 101a, 102a, lower side portion 105a, and upper side portion 106a of slit 90a, electric field perpendicular to each side portion is generated. Similarly, in short side portions 103a, 104a, lower side portion 107a, and upper side portion 108a of slit 91b, electric field perpendicular to each side portion is generated. Consequently, external force is applied from electric field to liquid crystal molecules 80 located in the vicinity of each side portion in a direction perpendicular to each side portion.

Figure 22:
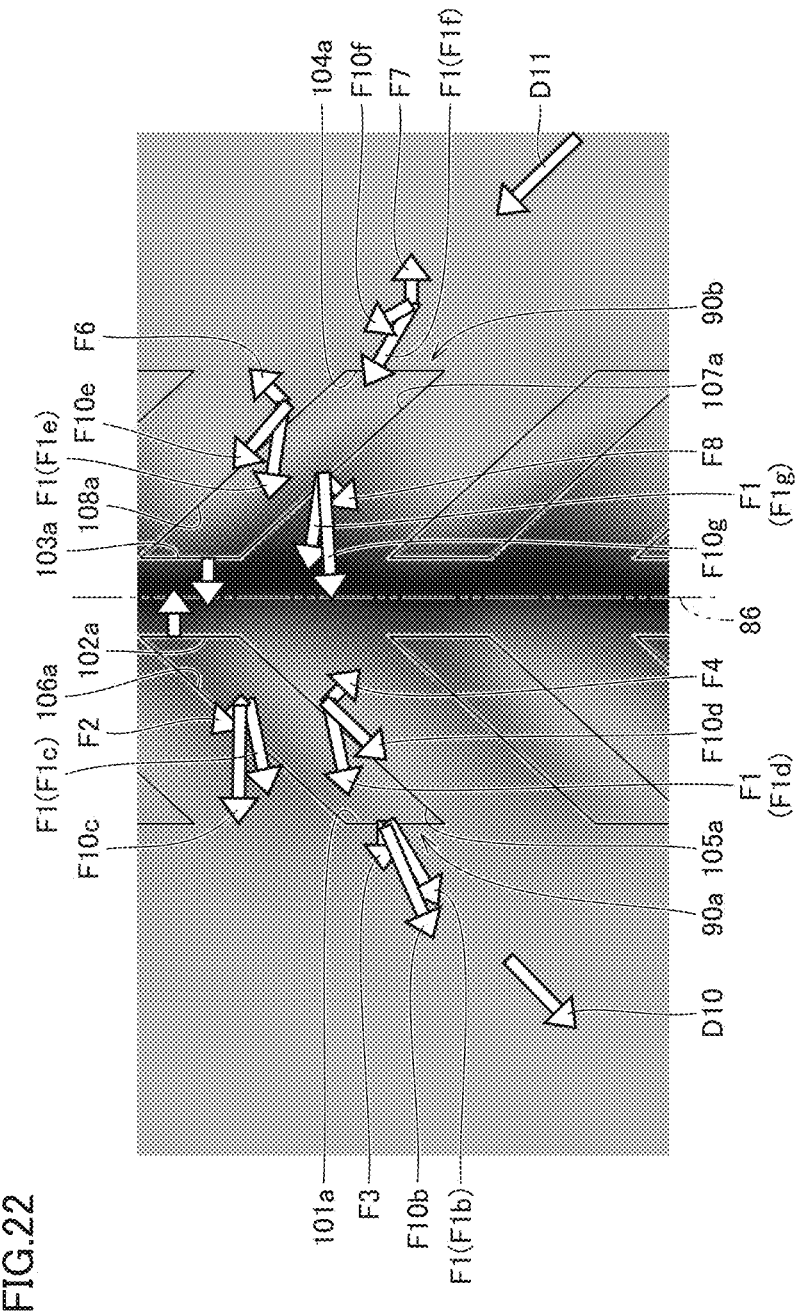
FIG. 22 is a photograph showing alignment external force applied to liquid crystal molecules.

Specifically, external force F2, F3, F4, F5 is applied to liquid crystal molecules 80 located in the vicinity of upper side portion 106a, short side portion 101a, lower side portion 105a, and short side portion 102a of slit 90a. Similarly, external force F6, F7, F8, F9 is applied to liquid crystal molecules 80 located around upper side portion 108a, short side portion 104a, lower side portion 107a, and short side portion 103a of slit 91b. Then, as shown in FIG. 22, resultant force F1 shown in FIG. 20 and external force shown in FIG. 21 are applied to liquid crystal molecules 80.

Resultant force F1 (F1b) and external force F3 are applied to liquid crystal molecules 80 located around short side portion 101a, and consequently alignment external force F10b is applied to liquid crystal molecules 80. An angle of orientation of resultant force F1b is smaller than director orientation D10 and an angle of orientation of external force F3 is also smaller than the angle of orientation of director orientation D10, so that an angle of orientation of alignment resultant force F10b is smaller than director orientation D10.

Resultant force F1 (F1c) and external force F2 are applied to liquid crystal molecules 80 located around upper side portion 106a, and consequently alignment external force F10c is applied to liquid crystal molecules 80. An angle of orientation of resultant force F1c is smaller than director orientation D10 and external force F2 is also smaller in angle of orientation than director orientation D10, so that an angle of orientation of alignment resultant force F10c is smaller than the angle of orientation of director orientation D10.

Resultant force F1 (F1d) and external force F4 are applied to liquid crystal molecules 80 located around lower side portion 105a, and consequently alignment external force F10d is applied to liquid crystal molecules 80. An angle of orientation of resultant force F1d is smaller than an angle of orientation of director orientation D10, whereas an angle of orientation of external force F4 is greater than director orientation D10, so that an angle of orientation of alignment resultant force F10d substantially matches with director orientation D10.

Similarly, resultant force F1 (F1e) and external force F6 are applied to liquid crystal molecules 80 located around upper side portion 108a, and consequently alignment external force F10e is applied to liquid crystal molecules 80. Resultant force F1e is greater in angle of orientation than director orientation D11, whereas an angle of orientation of external force F6 is smaller than director orientation D11, so that an angle of orientation of resultant force F10e can substantially match with director orientation D11.

Resultant force F1f and external force F7 are applied to liquid crystal molecules 80 located in the vicinity of short side portion 104a, and consequently alignment external force F1f is applied to liquid crystal molecules 80. An angle of orientation of resultant force F1f is greater than director orientation D11, whereas an angle of orientation of external force F7 is smaller than the angle of orientation of director orientation D11, so that an angle of orientation of alignment resultant force F10f can substantially match with director orientation D11.

Resultant force F1g and external force F8 are applied to liquid crystal molecules 80 located around lower side portion 107a, and consequently alignment external force F10g is applied to liquid crystal molecules 80. An angle of orientation of resultant force F1g is greater than director orientation D11, whereas an angle of orientation of external force F8 is greater than the angle of orientation of director orientation D11, so that an angle of orientation of alignment resultant force F10g is also greater than the angle of orientation of director orientation D11.

Thus, an angle of orientation of alignment resultant force F10b and alignment resultant force F10c is smaller than the angle of orientation of director orientation D10, and an angle of orientation of alignment resultant force F10g is greater than an angle of orientation of director orientation D11.

Figure 23:
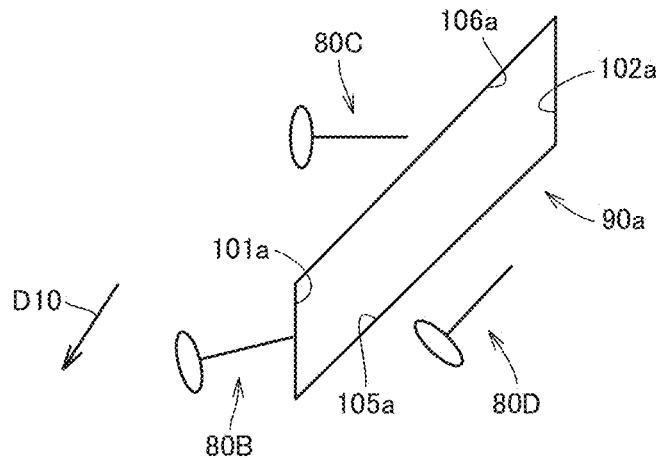

FIG. 23 is a schematic diagram showing a state of inclination of liquid crystal molecules 80 located around slit 90a. Angles of alignment of liquid crystal molecules 80B, 80C located around short side portions 101a, upper side portion 106a are smaller than an angle of orientation of director orientation D10. On the other hand, an angle of alignment of liquid crystal molecule 80D substantially matches with director orientation D10.

Figure 24:
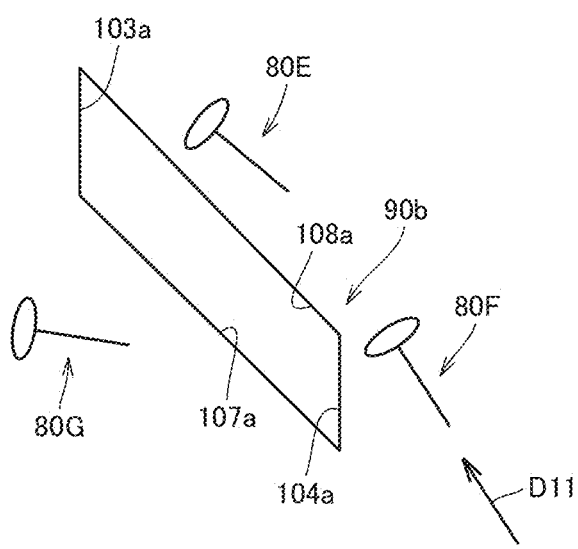
FIG. 24 is a schematic diagram showing a state of inclination of liquid crystal molecules 80 located around slit 90b.

FIG. 24 is a schematic diagram showing a state of inclination of liquid crystal molecules 80 located around slit 90b. An alignment orientation of a liquid crystal molecule 80G located around lower side portion 107a is greater in angle of orientation than director orientation D11. On the other hand, an alignment orientation of a liquid crystal molecule 80E located around upper side portion 108a and an alignment orientation of a liquid crystal molecule 80F located around short side portion 104a substantially match with an angle of orientation of director orientation D11.

As is clear also from FIGS. 23 and 24, liquid crystal molecules displaced from the angle of orientation of each of director orientation D10 and director orientation D11, such as liquid crystal molecules 80B, 80C, and 80G, are generated. Thus, light transmittance in the vicinity of short side portion 101a and upper side portion 106a of slit 90a and lower side portion 107a of slit 90b lowers.

Consequently, as shown in FIG. 18, a region low in light transmittance is caused in the vicinity of slit 90a and slit 91b.

Figure 25:
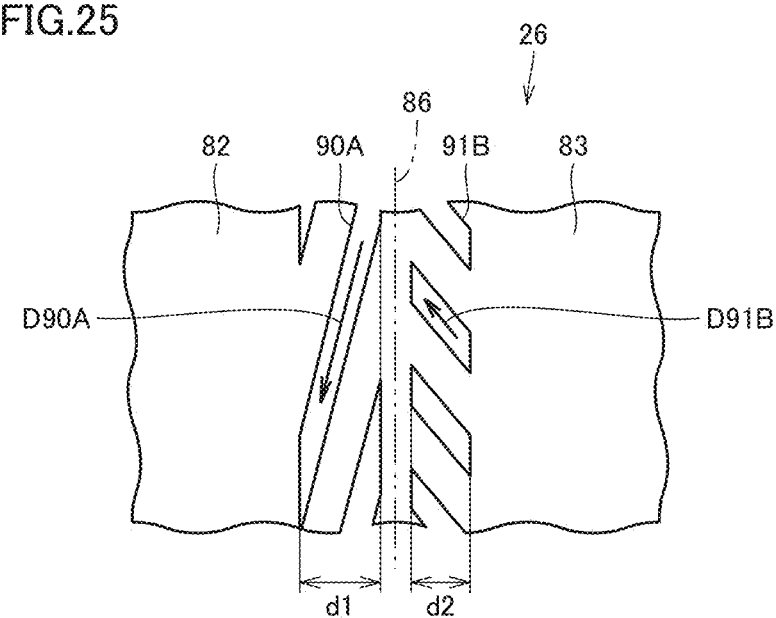
FIG. 25 is a plan view of pixel electrode 26 adopted in liquid crystal display apparatus 2 according to the present embodiment.
Figure 26:
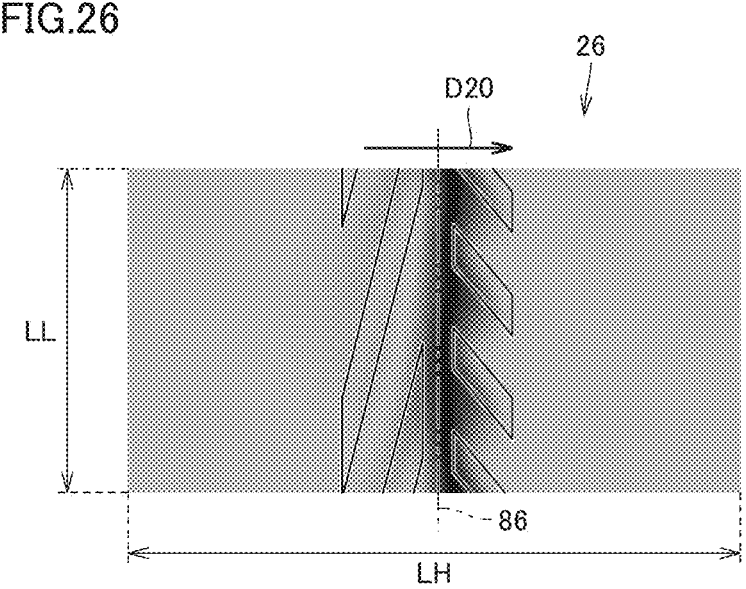
FIG. 26 is a plan view of a pixel in which pixel electrode 26 shown in FIG. 25 has been adopted.

FIG. 25 is a plan view of pixel electrode 26 adopted in liquid crystal display apparatus 2 according to the present embodiment, and FIG. 26 is a plan view of a pixel in which pixel electrode 26 shown in FIG. 25 has been adopted. In FIG. 25, extension orientation D90A of slit 90A is 255° and extension orientation D91B of slit 91B is 135°.

In addition, distance d1 between short side portions of slit 90A is 11 µm, and distance d2 between short side portions of slit 91B is 6 µm. Moreover, a width of slit 90A, 91B is 3 µm, and a distance between slits 90A and between slits 91B is 4 µm. It is noted that length LH in FIG. 26 is 100 µm and length LL is 45 µm.

This FIG. 26 is a plan view of a pixel in which pixel electrode 26 shown in FIG. 25 has been adopted. In the example shown in this FIG. 26, it can be seen that a dark line extending along boundary line 86 is smaller in thickness than the dark lines shown in FIGS. 16 and 18. In addition, a dark line extending along slit 90A is very thin.

Furthermore, in the example shown in FIG. 19 above, light transmittance lowers in the vicinity of short side portion 101a and upper side portion 106a, while lowering in light transmittance in that portion is suppressed in the example shown in FIG. 26. Then, the reason why lowering in light transmittance could be suppressed in the portion corresponding to short side portion 101a and upper side portion 106a in the example shown in FIG. 26 will be explained.

Figure 27:
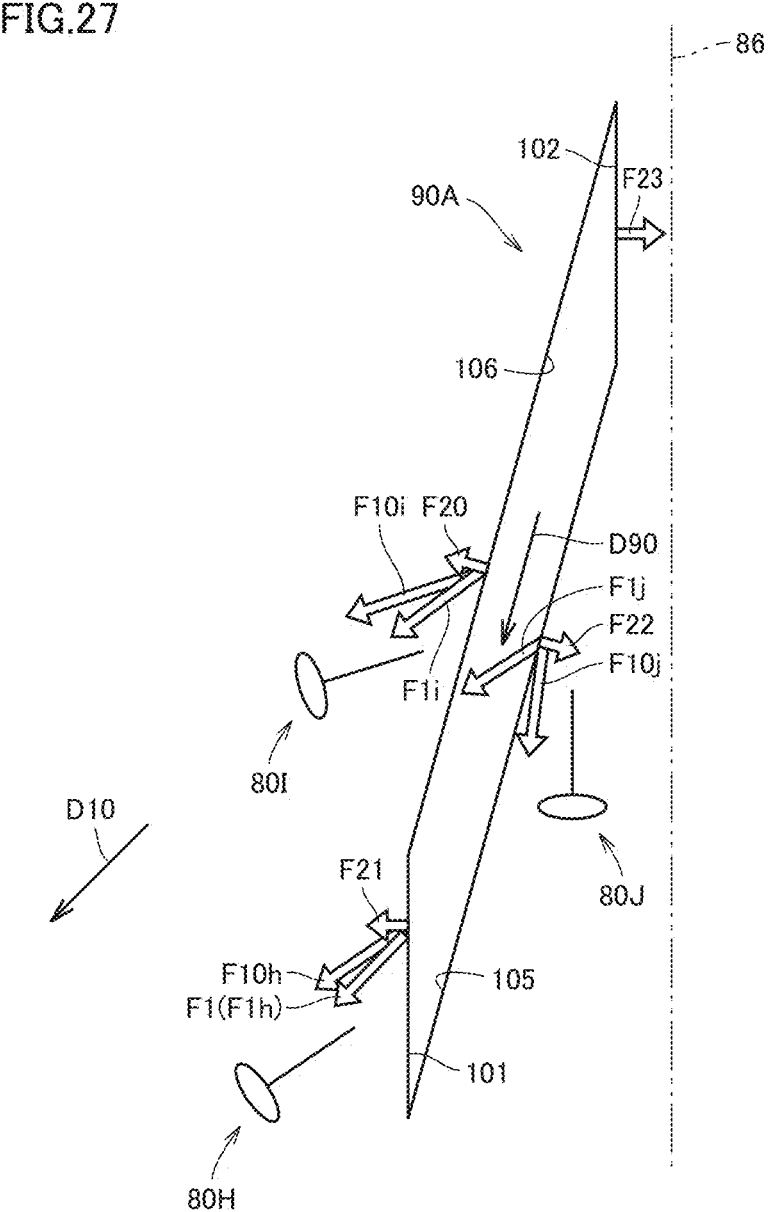
FIG. 27 is an enlarged view showing slit 90A and a portion around the same.

FIG. 27 is an enlarged view showing slit 90A and a portion around the same. As shown in this FIG. 27, alignment restriction force from alignment film 39, load applied across liquid crystal molecules 80 adjacent in the direction of the main surface of alignment film 39, and force from electric field formed around the slit of pixel electrode 26 are applied to liquid crystal molecules 80, and alignment orientations of liquid crystal molecules 80 are determined by total external force.

Here, alignment restriction force from alignment film 39 is not varied depending on a position of liquid crystal molecule 80 or a shape of a slit, but is constant. Load generated between adjacent liquid crystal molecules 80 is determined by a position of liquid crystal molecule 80.

Namely, it can be seen that resultant force of alignment restriction force from alignment film 39 and load generated between liquid crystal molecules 80 is determined by a position of liquid crystal molecule 80. Then, initially, resultant force of alignment restriction force from alignment film 39 and load received from surrounding liquid crystal molecules by a liquid crystal molecule 80H located in the vicinity of short side portion 101, a liquid crystal molecule 80I located in the vicinity of upper side portion 106, and a liquid crystal molecule 80J located in the vicinity of lower side portion 105 will be discussed.

Liquid crystal molecule 80H located in the vicinity of short side portion 101 receives resultant force F1h which is resultant force of alignment restriction force from alignment film 39 and load received from surrounding liquid crystal molecules. Here, a distance between short side portion 101 and boundary line 86 is greater than a distance between boundary line 86 and short side portion 101a shown in FIG. 22. Therefore, an angle of orientation of resultant force F1h is closer to the angle of orientation of director orientation D10, than the angle of orientation of resultant force F1b shown in FIG. 22.

Liquid crystal molecule 80I located in the vicinity of upper side portion 106 receives resultant force F1i which is resultant force of alignment restriction force from alignment film 39 and load received from surrounding liquid crystal molecules. Since a position of liquid crystal molecule 80I and a position of liquid crystal molecule 80C shown in FIG. 23 substantially match with each other, resultant force F1i shown in FIG. 27 and resultant force F1c shown in FIG. 22 substantially match with each other.

Liquid crystal molecule 80J located in the vicinity of lower side portion 105 receives resultant force F1j which is resultant force of alignment restriction force from alignment film 39 and load received from surrounding liquid crystal molecules. Since a position of liquid crystal molecule 80J and a position of liquid crystal molecule 80D shown in FIG. 23 substantially match with each other, resultant force F1j shown in FIG. 27 and resultant force F1d shown in FIG. 22 substantially match with each other.

Then, alignment resultant force formed by external force applied from electric field to liquid crystal molecule 80I, liquid crystal molecule 80H, and liquid crystal molecule 80J and resultant force which is resultant force of alignment restriction force from alignment film 39 and load applied by surrounding liquid crystal molecules will be discussed.

External force F21 perpendicular to short side portion 101 is applied from electric field to liquid crystal molecule 80H. An angle of orientation of external force F21 and an angle of orientation of external force F3 shown in FIG. 22 substantially match with each other. Then, resultant force F1h and external force F21 form alignment resultant force F10h, so that liquid crystal molecule 80H is inclined toward the angle of orientation of alignment resultant force F10h.

As described above, since the angle of orientation of resultant force F1h is closer to director orientation D10 than resultant force F1b shown in FIG. 22, the angle of orientation of alignment resultant force F10*h* approximates more to the angle of orientation of director orientation D10 than the angle of orientation of alignment resultant force F10*b*. Consequently, lowering in light transmittance is suppressed in the vicinity of short side portion 101.

External force F20 perpendicular to upper side portion 106 is applied from electric field to liquid crystal molecule 80I. Since extension orientation D90 of slit 90A is greater than the extension orientation of slit 90*a* shown in FIG. 22, an angle of orientation of external force F20 approximates more to the angle of orientation of director orientation D10 than the angle of orientation of external force F2 shown in FIG. 22.

This external force F20 and resultant force F1*i* form alignment resultant force F10*i*, so that liquid crystal molecule 80I is inclined toward the angle of orientation of alignment resultant force F10*i*. The angle of orientation of resultant force F1*i* matches with the angle of orientation of resultant force F1*c*, whereas the angle of orientation of external force F20 approximates more to director orientation D10 than external force F2. Therefore, the angle of orientation of alignment resultant force F10*i* approximates more to the angle of orientation of director orientation D10 than the angle of orientation of alignment resultant force F10*c* shown in FIG. 22. Thus, lowering in light transmittance in the vicinity of upper side portion 106 is suppressed.

External force F22 perpendicular to lower side portion 105 is applied from electric field to liquid crystal molecule 80J. Since extension orientation D90 of slit 90A is greater than the extension orientation of slit 90*a* shown in FIG. 22, the angle of orientation of external force F4 shown in FIG. 22 approximates more to the angle of orientation of director orientation D10 than the angle of orientation of external force F22.

This external force F22 and resultant force F1*j* form alignment resultant force F10*j*, so that liquid crystal molecule 80J is inclined toward the angle of orientation of alignment resultant force F10*j*. Here, the angle of orientation of resultant force F1*j* and the angle of orientation of resultant force F1*d* shown in FIG. 22 substantially match with each other, whereas the angle of orientation of external force F4 approximates more to the angle of orientation of director orientation D10 than the angle of orientation of external force F22. Therefore, alignment resultant force F10*d* shown in FIG. 22 approximates more to director orientation D10 than the angle of orientation of alignment resultant force F10*j*.

Thus, light transmittance in the vicinity of lower side portion 105 may be lower than light transmittance in the vicinity of lower side portion 105*a* shown in FIG. 22. Thus, since light transmittance in the vicinity of upper side portion 106 and short side portion 101 is improved as compared with light transmittance in the vicinity of upper side portion 106*a* and short side portion 101*a*, light transmittance around slit 90A is improved as compared with light transmittance around slit 90*a*.

Figure 28:
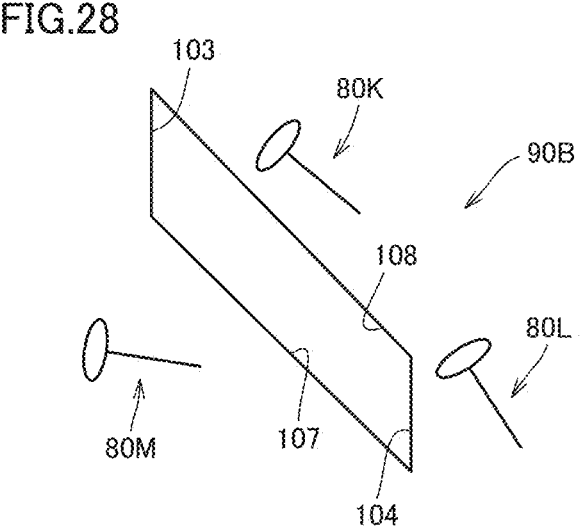
FIG. 28 is a plan view schematically showing slit 90B and liquid crystal molecules 80 located around slit 90B.

It is noted that FIG. 28 is a plan view schematically showing slit 90B and liquid crystal molecules 80 located around slit 90B. Slit 90B and slit 90*b* shown in FIG. 22 are substantially the same in shape. Therefore, a liquid crystal molecule 80K and liquid crystal molecule 80E shown in FIG. 24 are inclined substantially in the same orientation. Similarly, liquid crystal molecules 80L, 80M and liquid crystal molecules 80F, 80G shown in FIG. 22 are inclined in the same orientation. Thus, light transmittance around slit 90B and light transmittance around slit 90*b* substantially match with each other.

Consequently, as shown in FIGS. 26 and 18, the pixel shown in FIG. 26 is higher in light transmittance.

Figure 29:
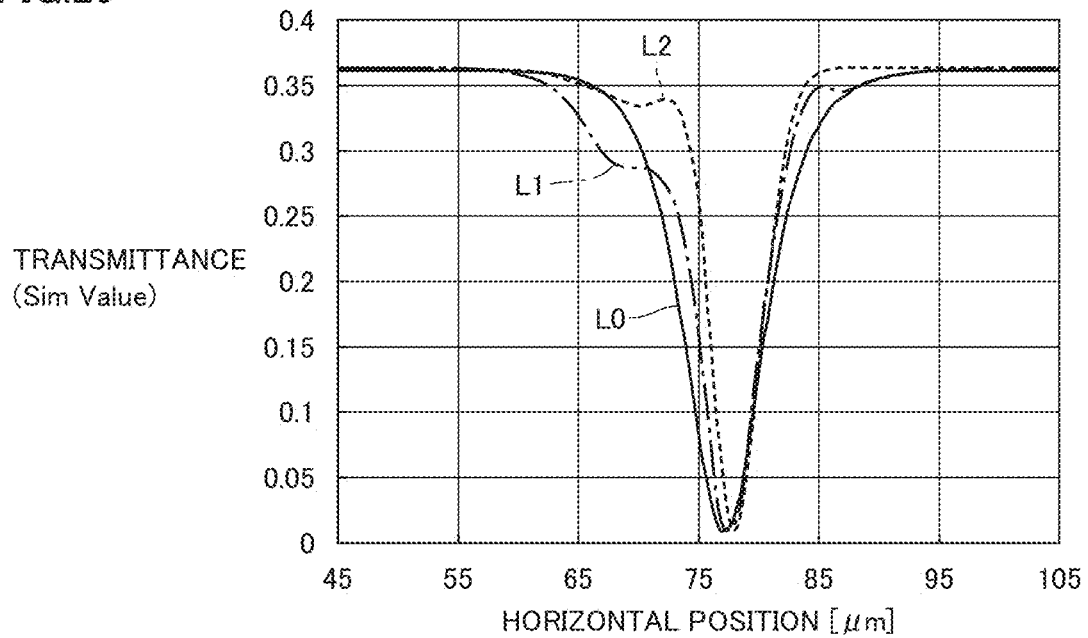
FIG. 29 is a graph showing light transmittance of the pixels in FIGS. 16, 18, and 26 above.

FIG. 29 is a graph showing light transmittance of the pixels in FIGS. 16, 18, and 26 above. The abscissa in FIG. 29 shows a position in a lateral direction (an analysis direction D20) in FIGS. 16, 18, and 26, and boundary line 86 shown in FIGS. 16, 18, and 26 is located at a horizontal position 75 (μm) in FIG. 29. The ordinate represents light transmittance, with complete passage of light being defined as 1.0. Specifically, it represents an average value of light transmittance in a vertical direction at each horizontal position.

Then, in FIG. 29, a solid line L0 represents light transmittance at the time when a pixel electrode having no slit formed is employed as shown in FIG. 16, and alternate long and short dashed lines L1 represent light transmittance at the time when a pixel electrode having slit 90*a*, slit 91*b* formed as shown in FIG. 18 is employed.

In addition, a dashed line L2 in FIG. 29 represents light transmittance at the time when a pixel electrode having slits 90A, 91B formed as shown in FIG. 26 is employed. Then, as is clear also from FIG. 29, it can be seen that light transmittance is highest in the case where pixel electrode 26 having slit 90A and slit 91B formed is adopted.

Then, relation between a direction of extension of each slit 90A, 91B and light transmittance will now be described with reference to FIGS. 30 to 35.

Figure 30:
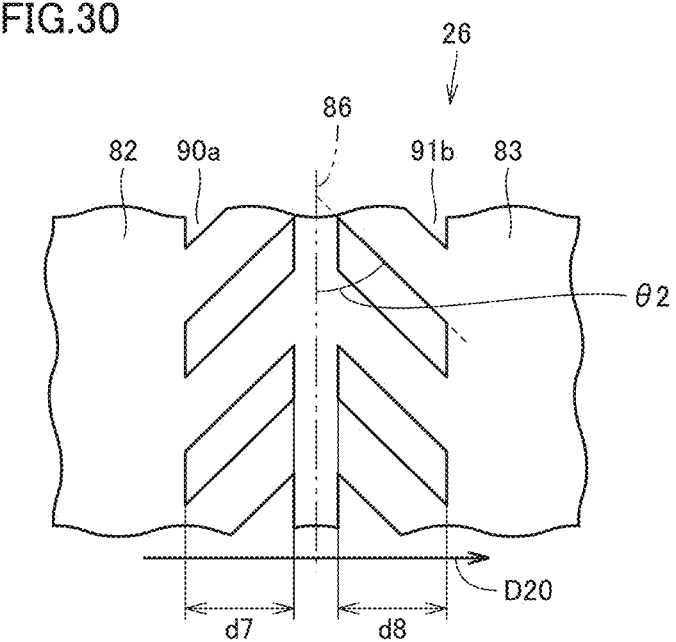
FIG. 30 is a plan view schematically showing pixel electrode 26 having slit 90a and slit 91b formed.

FIG. 30 is a plan view schematically showing pixel electrode 26 having slit 90*a* and slit 91*b* formed. As shown in this FIG. 30, in pixel electrode 26, slit 90*a* and slit 91*b* are formed to be symmetric with respect to boundary line 86. It is noted that a distance d7 between short side portions of slit 90*a* is 10 μm and a distance d8 between short side portions of slit 91*b* is also 10 μm.

Then, light transmittance of a pixel in which pixel electrode 26 of which angle of intersection θ2 between boundary line 86 and slit 91*b* is set to 45°, 30°, and 15° is adopted and light transmittance of a pixel in which pixel electrode 26 having no slit 90*a*, slit 91*b* formed is adopted will be compared with each other.

Figure 31:
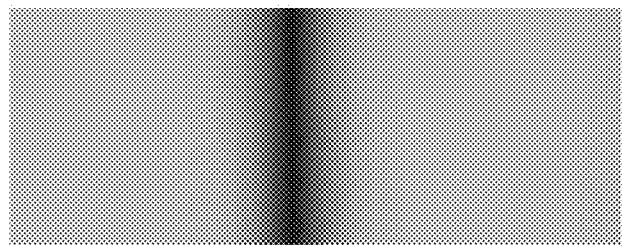
FIG. 31 is a plan view of a pixel where pixel electrode 26 not having slit 90a and slit 91b formed is adopted.
Figure 32:
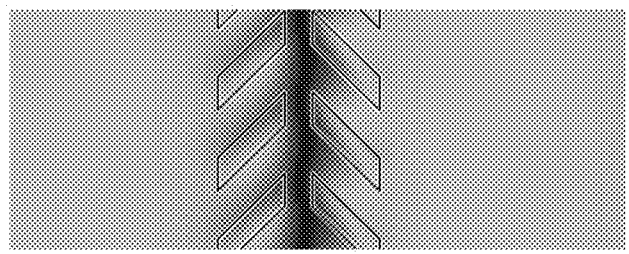
FIG. 32 is a plan view of a pixel where pixel electrode 26 of which angle of intersection θ2 is 45° is adopted.
Figure 33:
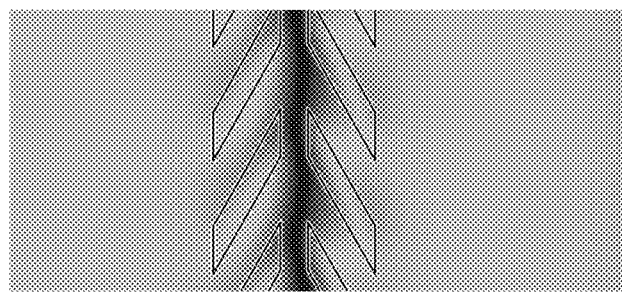
FIG. 33 is a plan view of a pixel where pixel electrode 26 of which angle of intersection θ2 is 30° is adopted.
Figure 34:
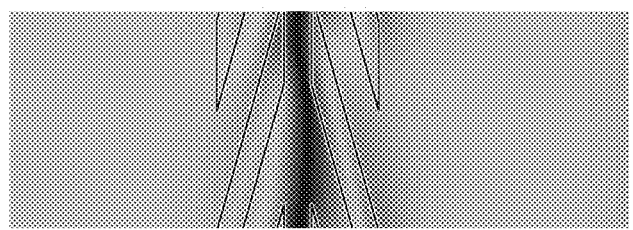
FIG. 34 is a plan view of a pixel where pixel electrode 26 of which angle of intersection θ2 is 15° is adopted.

FIG. 31 is a plan view of a pixel where pixel electrode 26 having no slit 90*a*, slit 91*b* formed is adopted. FIG. 32 is a plan view of a pixel where pixel electrode 26 of which angle of intersection θ2 is 45° is adopted. FIG. 33 is a plan view of a pixel where pixel electrode 26 of which angle of intersection θ2 is 30° is adopted. FIG. 34 is a plan view of a pixel where pixel electrode 26 of which angle of intersection θ2 is 15° is adopted.

Figure 35:
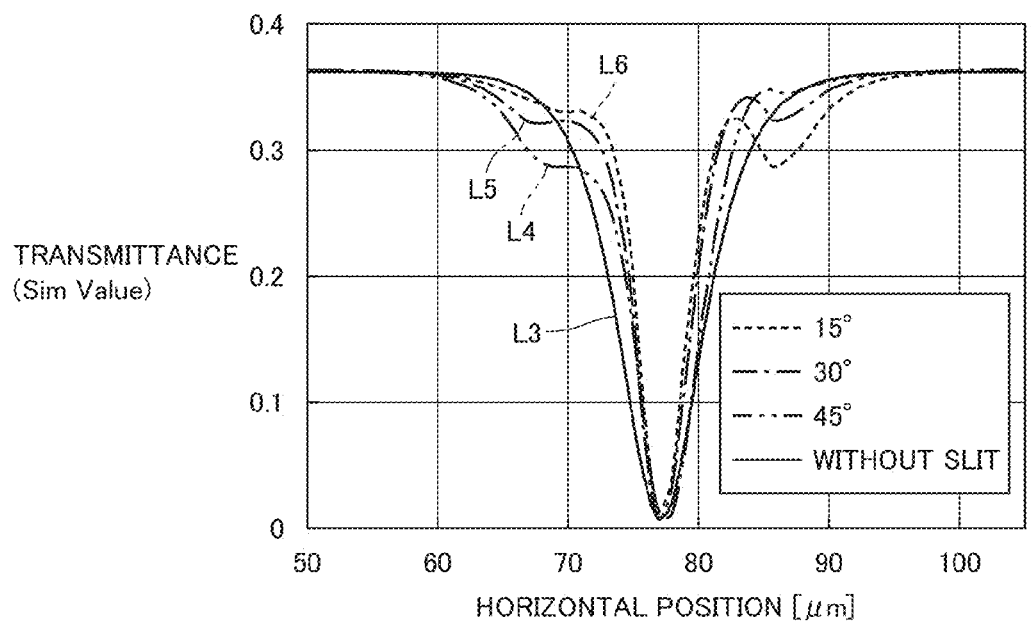
FIG. 35 is a graph showing relation between light transmittance and a horizontal position.

Then, a graph shown in FIG. 35 is a graph showing light transmittance of the pixels shown in FIGS. 31 to 34. The abscissa of the graph shown in FIG. 35 represents a position in a lateral direction (analysis direction D20) of each pixel shown in FIGS. 31 to 34, and in this FIG. 35, boundary line 86 is located at a horizontal position of 75 (μm). The ordinate represents light transmittance, with complete passage of light being defined as 1.0.

In addition, a solid line L3 represents light transmittance of the pixel shown in FIG. 31, and a chain double dotted line L4 represents light transmittance of the pixel shown in FIG. 32. Alternate long and short dashed lines L5 represent light transmittance shown in FIG. 33, and a dashed line L6 represents light transmittance of the pixel shown in FIG. 34.

In this FIG. 35, initially, attention is paid to light transmittance at the horizontal position of 75 (μm) and an area in the vicinity thereof.

It can be seen that the pixel including pixel electrode 26 having slit 90*a*, 91*b* formed is smaller in thickness of a dark line formed at the horizontal position of 75 (μm) and the area in the vicinity thereof than the pixel including pixel electrode 26 having no slit formed.

In particular, it can be seen that, as shown with alternate long and short dashed lines L5 and dashed line L6, by setting angle of intersection θ2 with slit 90*a* and slit 91*b* to 45° and 30°, a dark line formed in the vicinity of the horizontal position of 75 (μm) can be thinner.

Then, attention is paid to an area where a horizontal position is smaller than 75 (μm), on chain double dotted line L4, alternate long and short dashed lines L5, and dashed line L6.

It can be seen that dashed line L6 is higher in light transmittance in an area where a horizontal position is smaller than 75 μm. This is attributed to the fact that a dark line is caused along slit 90*a* when angle of intersection θ2 with slit 90*a* is set to 45° and 30° as shown in FIGS. 32 and 33, whereas almost no dark line is caused along slit 90*a* when angle of intersection θ2 is set to 15°.

Then, attention is paid to an area where a horizontal position is greater than 75 (μm), on chain double dotted line L4, alternate long and short dashed lines L5, and dashed line L6. It can be seen that, in that area, chain double dotted line L4 is highest in light transmittance.

This is attributed to the fact that a dark line is caused along slit 91*b* when angle of intersection θ2 with slit 91*b* is set to 30° and 15° as shown in FIGS. 33 and 34, whereas a dark line extending along slit 91*b* decreases when angle of intersection θ2 is set to 45° as shown in FIG. 32.

Domain 70 is located in the area where a horizontal position is smaller than 75 (μm), and domain 71 is located in the area where a horizontal position is greater than 75 (μm). Then, director orientation D10 of domain 70 is greater than director orientation D11 of domain 71.

Thus, it can be seen that, at the boundary between domain 70 great in director orientation D10 and domain 71 small in director orientation D11, slit 90*a* formed in a portion of pixel electrode 26 opposed to domain 70 great in director orientation D10 is preferably smaller in angle of intersection with boundary line 86 than slit 91*b* formed in a portion opposed to domain 71 small in director orientation D11.

In addition, it can be seen that extension orientation D90*a* of slit 90*a* is preferably greater than director orientation D10 and extension orientation D91*b* of slit 91*b* preferably substantially matches with director orientation D11.

The reason why there is a difference as such in state of appearance of dark lines between left and right is considered to be because of the difference in director orientation between left and right. A liquid crystal display apparatus in which domains different in director orientation D10, D11 are arranged to be adjacent to each other is formed such that a difference in angle of orientation between director orientation D10 and extension orientation D90*a* of slit 90*a* opposed to a domain great in director orientation is greater than a difference in angle of orientation between director orientation D11 and extension orientation D91*b* of slit 91*b* opposed to a domain small in director orientation. Thus, light transmittance of each pixel of liquid crystal display apparatus 2 is improved.

Figure 36:
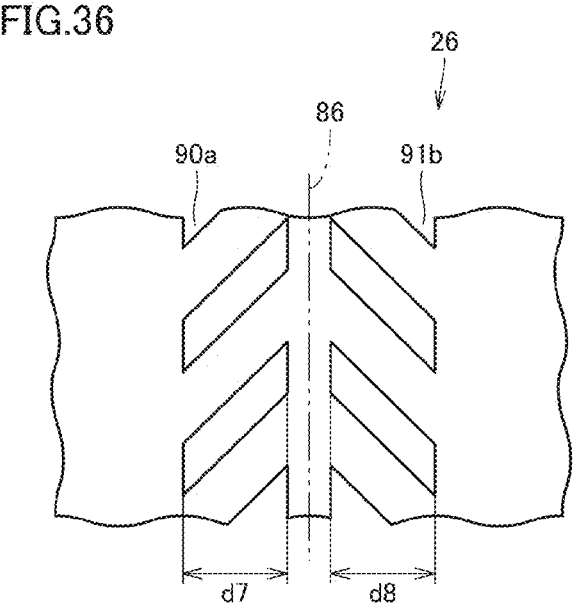
FIG. 36 is a plan view schematically showing pixel electrode 26.

A length between short side portions of a slit will now be discussed with reference to FIGS. 36 to 40. FIG. 36 is a plan view schematically showing pixel electrode 26.

As shown in this FIG. 36, slit 90*a* and slit 91*b* are formed to be symmetric with respect to boundary line 86. It is noted that an angle of intersection formed between slit 90*a*, slit 91*b* and boundary line 86 is 45° in FIGS. 38 to 40.

Figure 37:
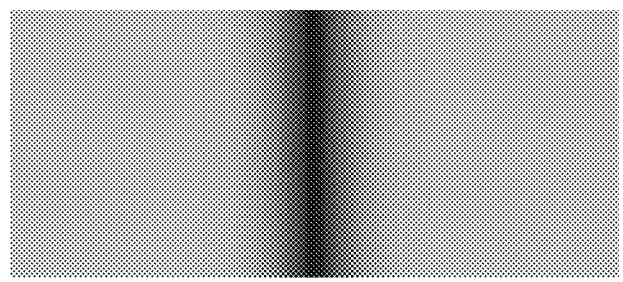
FIG. 37 is a plan view of a pixel in which pixel electrode 26 not having slit 90a and slit 91b formed has been adopted.
Figure 38:
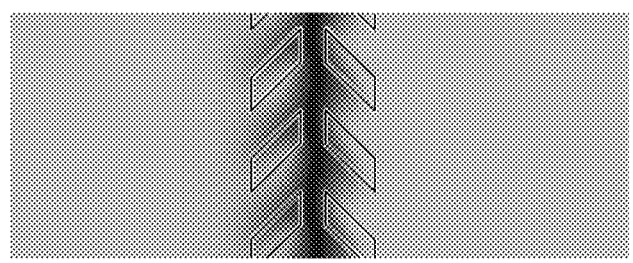
FIG. 38 is a plan view of a pixel in which pixel electrode 26 where a distance d7, d8 between short side portions of slits 90a, 91b is set to 7.5 (μm) is adopted.
Figure 39:
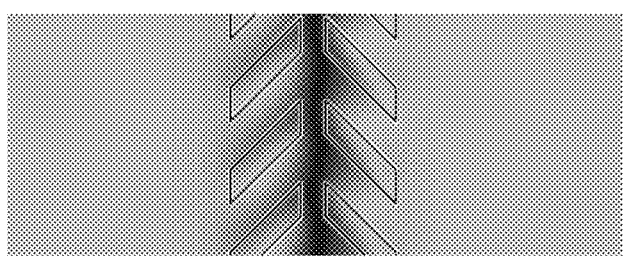
FIG. 39 is a plan view of a pixel in which pixel electrode 26 where distance d7, d8 between short side portions of slits 90a, 91b is set to 10 (μm) is adopted.
Figure 40:
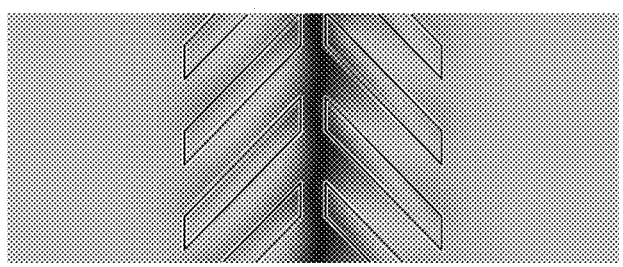
FIG. 40 is a plan view of a pixel in which pixel electrode 26 where distance d7, d8 between short side portions of slits 90a, 91b is set to 15 (μm) is adopted.

FIG. 37 is a plan view of a pixel in which pixel electrode 26 having no slit 90*a*, slit 91*b* formed has been adopted, and FIG. 38 is a plan view of a pixel in which pixel electrode 26 where distance d7, d8 between short side portions of slit 90*a*, 91*b* is set to 7.5 (μm) is adopted. FIG. 39 is a plan view of a pixel in which pixel electrode 26 where distance d7, d8 between short side portions of slit 90*a*, 91*b* is set to 10 (μm), and FIG. 40 is a plan view of a pixel in which pixel electrode 26 where distance d7, d8 between short side portions of slit 90*a*, 91*b* is set to 15 (μm) is adopted.

Figure 41:
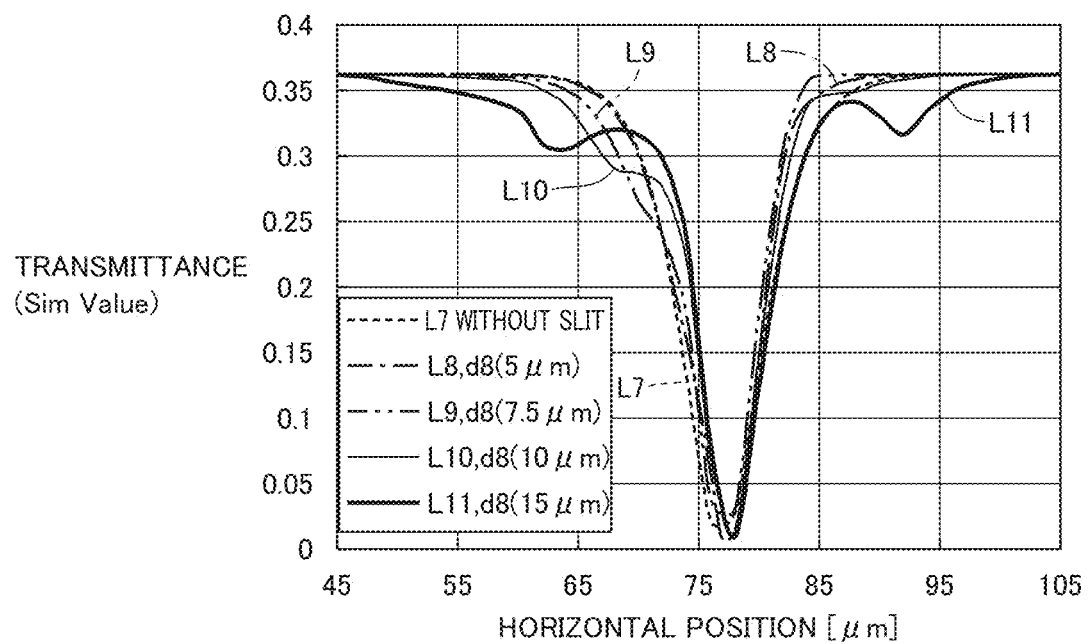
FIG. 41 is a graph showing light transmittance of each pixel including pixel electrode 26 where distance d7, d8 between short side portions of slits 90a, 91b is set to 5.0 (μm), 7.5 (μm), 10 (μm), 15 (μm) and a pixel including a pixel electrode having no slit formed.

Then, FIG. 41 is a graph showing light transmittance of each pixel at the time when pixel electrode 26 where distance d7, d8 between short side portions of slit 90*a*, 91*b* is set to 5.0 (μm), 7.5 (μm), 10 (μm), 15 (μm) is employed and a pixel including a pixel electrode having no slit formed.

In this FIG. 41 as well, the abscissa represents a horizontal position in a pixel and boundary line 86 is located at 75 (μm). The ordinate represents light transmittance, with complete passage of light being defined as 1.00. It is noted that a dashed line L7 represents light transmittance of a pixel at the time when a pixel electrode having no slit formed as shown in FIG. 37 has been adopted. Alternate long and short dashed lines L8 represent light transmittance of a pixel in which a pixel electrode where distance d7, d8 is set to 5.0 μm is adopted in FIG. 36. A chain double dotted line L9 represents light transmittance of a pixel in which a pixel electrode where distance d7, d8 is set to 7.5 μm is adopted in FIG. 36. A solid line L10 represents light transmittance of a pixel in which a pixel electrode where d7, d8 is set to 10 μm is adopted in FIG. 36. A thick line L11 represents light transmittance of a pixel in which a pixel electrode where d7, d8 is set to 15 μm is adopted in FIG. 36.

As shown in this FIG. 41, it can be seen that a pixel in which pixel electrode 26 having slit 90*a* and slit 91*b* formed is adopted is higher in light transmittance than a pixel in which pixel electrode 26 having no slit 90*a*, slit 91*b* formed is adopted.

In particular, it can be seen that a dark line formed on boundary line 86 can be smaller in thickness by forming a slit, as is clear also from FIGS. 37 to 40.

Then, attention is paid to an area where a horizontal position is smaller than 75 (μm). Here, in observation of FIGS. 38 to 40 in detail, as distance d7 of slit 90*a* is greater, a thickness of a left half of a dark line formed on boundary line 86 becomes smaller. On the other hand, as distance d7 of slit 90*a* is greater, light transmittance around an end portion of slit 90*a* lowers.

Consequently, it can be seen that distance d7 of slit 90*a* less affects total light transmittance.

Then, attention is paid to an area where a horizontal position is greater than 75 (μm). As is clear also from the graph shown in FIG. 41 and FIGS. 38 to 40 above, as distance d8 of slit 91*b* is greater, light transmittance around an end portion of slit 91*b* is lower.

Therefore, a preferred range of distance d8 of slit 91*b* is greater than 0 μm and not greater than 10 μm. A range greater than 0 μm and not greater than 7.5 μm is preferred, and in addition, a range of distance d8 of slit 91*b* not smaller than 5 μm and not greater than 7.5 μm is preferred.

The reason why there is a difference as such in state of appearance of dark lines between left and right is considered to be because of the difference in director orientation between left and right. Liquid crystal display apparatus 2 according to the present embodiment achieves improvement in light transmittance of each pixel by forming a liquid crystal display apparatus in which domains different in director orientation D10, D11 are arranged to be adjacent to each other such that distance d8 of slit 91*b* is greater than distance d7 of slit 90*a*.

Figure 42:
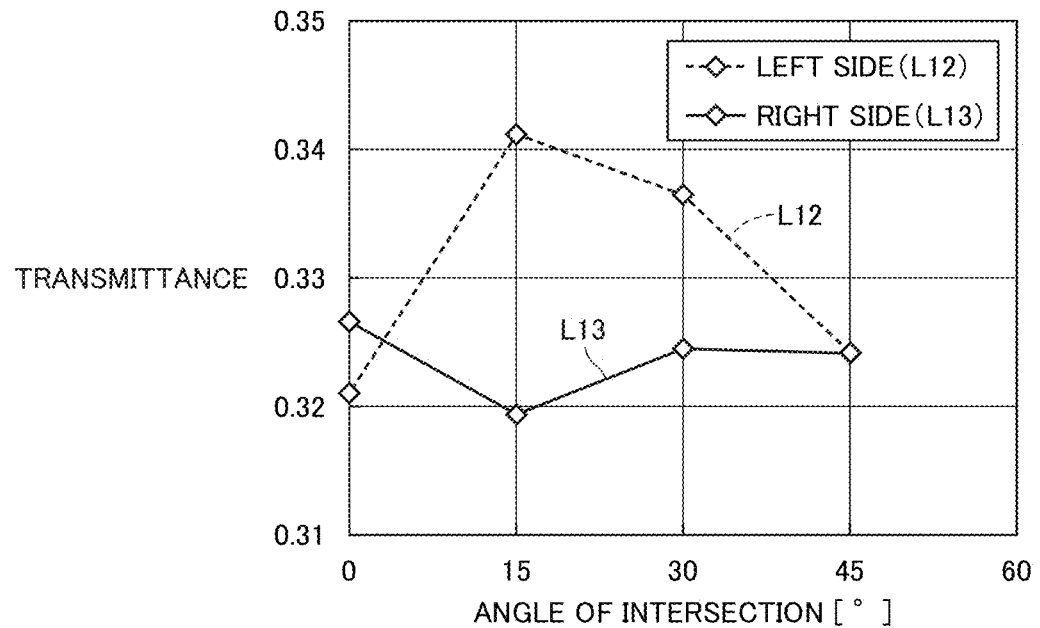
FIG. 42 is a graph showing results shown in FIGS. 31 to 34 above and a graph showing light transmittance on the left of a boundary line 86 and light transmittance on the right of boundary line 86.

FIG. 42 is a graph showing results shown in FIGS. 31 to 34 above and a graph showing light transmittance on the left of boundary line 86 and light transmittance on the right of boundary line 86.

The abscissa in the graph in this FIG. 42 represents an angle of intersection between slit 90*a*, slit 91*b* and boundary line 86, and the ordinate represents light transmittance, with complete passage of light being defined as 1.

It is noted that "angle of intersection 0°" in the graph indicates light transmittance of a pixel where pixel electrode 26 having no slit 90*a*, slit 91*b* formed is adopted.

A dashed line L12 represents light transmittance in a portion of a pixel located on the left of boundary line 86, and a solid line L13 represents light transmittance in a portion of a pixel located on the right of boundary line 86.

As shown with dashed line L12, a preferred range of an angle of intersection between slit 90*a* and boundary line 86 is greater than 0° and not greater than 30°. Here, an angle formed between the extension orientation of slit 90*a* and director orientation D10 is not smaller than 15° and smaller than 45°. In addition, it can be seen that high light transmittance can be obtained even when an angle of intersection between slit 90*a* and boundary line 86 is not smaller than 30° and not greater than 45°. It is noted that an angle of intersection between the extension orientation of slit 90*a* and director orientation D10 at this time is greater than 0° and not greater than 15°. An angle of intersection between slit 90*a* and boundary line 86 may be not smaller than 15° and not greater than 30°.

As shown with solid line L13, it can be seen that light transmittance is not much affected if an angle of intersection between slit 91*b* and boundary line 86 is greater than 0°.

Namely, it can be seen that an angle of orientation of extension orientation D91*b* of slit 91*b* should only be not greater than an angle of orientation of director orientation D11 of domain 71.

Figure 43:
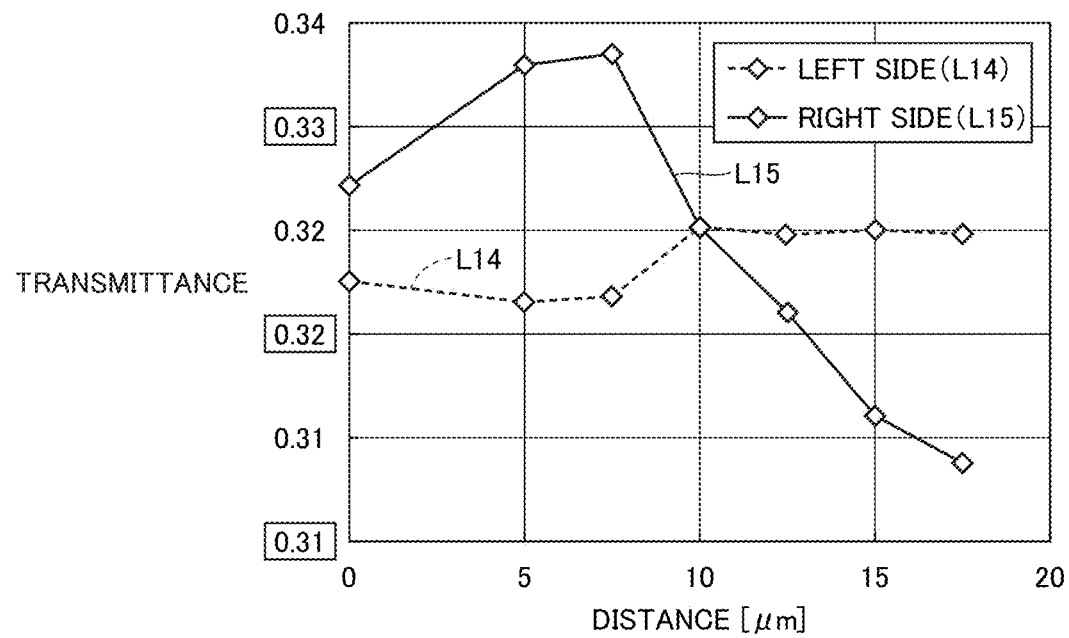
FIG. 43 is a graph showing results in FIGS. 37 to 40 above and a graph showing light transmittance on the left of boundary line 86 and light transmittance on the right of boundary line 86.

FIG. 43 is a graph showing results in FIGS. 37 to 40 above and a graph showing light transmittance on the left of boundary line 86 and light transmittance on the right of boundary line 86.

The abscissa in the graph shown in this FIG. 43 represents distance d7 and distance d8 of slit 90*a* and slit 91*b*, and the ordinate represents light transmittance, with complete passage of light being defined as 1.

It is noted that a scale surrounded by a white quadrangle in a scale of the ordinate represents a scale for dashed line L14 and a scale not surrounded by a white quadrangle is a scale for a solid line L15.

Dashed line L14 represents light transmittance in a portion of a pixel located on the left of boundary line 86 and solid line L15 represents light transmittance in a portion of a pixel located on the right of boundary line 86.

It is noted that distance d7 and distance d8 of "0 µm" indicates light transmittance where pixel electrode 26 having no slit 90*a*, slit 91*b* formed is adopted.

As shown with dashed line L14, it can be seen that distance d7 of slit 90*a* less affects light transmittance.

On the other hand, it can be seen that distance d8 of slit 91*b* is preferably greater than 0 µm and not greater than 7.5 µm as shown with solid line L15. In addition, it can be seen that a range of distance d8 of slit 91*b* not smaller than 5 µm and not greater than 7.5 µm is preferred. Though an example where a slit is formed in pixel electrode 26 has been described above, a slit may be formed in common electrode 35 and may be formed in each of pixel electrode 26 and common electrode 35.

Though the embodiment and the example of the present invention have been described above, it should be understood that the embodiment and the example disclosed herein are illustrative and non-restrictive in every respect. The scope of the present invention is defined by the terms of the claims, and is intended to include any modifications within the scope and meaning equivalent to the terms of the claims. In addition, the numeric value above, or the like is by way of example and limitation to the numeric value and the range above is not intended.

INDUSTRIAL APPLICABILITY

The present invention is applicable to a liquid crystal display apparatus and particularly suitable for a liquid crystal display apparatus having a plurality of domains.

REFERENCE SIGNS LIST

1 television receiver; 2 liquid crystal display apparatus; 3 housing; 4 control unit; 5 front panel; 6 back surface case; 7 base; 8 window portion; 10 liquid crystal display panel; 11, 12 polarizing plate; 13 backlight unit; 20 active matrix substrate; 21 opposing substrate; 22, 33 transparent substrate; 23 switching element; 24 gate interconnection; 25 source interconnection; 26 pixel electrode; 27 gate terminal portion; 28 source terminal portion; 29 liquid crystal layer; 30 gate electrode; 31 source electrode; 32 drain electrode; 34 color filter; 35 common electrode; 36 gate insulating film; 37 semiconductor layer; 38, 39 alignment film; 43 lower metal film; 44 upper metal film; 45, 46 amorphous silicon film; 50 interlayer insulating film; 51 passivation film; 52 planarizing film; 53 contact hole; 60, 61, 62, 63, 64, 65, 66, 67 alignment region; 70, 71, 72, 73 domain; 75 horizontal position; 80, 80A, 80B liquid crystal molecule; 80*a* end portion; 80*b* shaft portion; 81 slit formation region; 82, 82, 83, 84, 85 flat surface region; 86, 87, 88, 89 boundary line; 90, 91, 92, 93 slit; 95 trunk portion; 96 branch portion; 101, 102 short side portion; D90A, D90*a*, D91B, D91*b* extension orientation; D0, D1, D2, D3, D4, D5, D6, D7 alignment orientation; D10, D11, D12, D13 director orientation; D20 analysis direction; DB reference orientation; E electric field; W1, W2, d9 width; and d1, d2, d3, d4, d7, d8 distance.

The invention claimed is:

1. A liquid crystal display apparatus, comprising:
a liquid crystal layer containing a plurality of liquid crystal molecules;
a first alignment film arranged to be adjacent to said liquid crystal layer;
a first alignment region provided in said first alignment film, for aligning said liquid crystal molecules;
a second alignment region provided in said first alignment film and arranged to be adjacent to said first alignment region, for aligning said liquid crystal molecules;
a first electrode arranged opposite to said liquid crystal layer with respect to said first alignment film;
a plurality of first slit portions formed in said first electrode, opposed to a portion of said first alignment region adjacent to a boundary line between said first alignment region and said second alignment region, and extending in a direction away from said boundary line;
a plurality of second slit portions formed in said first electrode, opposed to a portion of said second alignment region adjacent to said boundary line, and extending in a direction away from said boundary line;
a second alignment film opposed to said first alignment film with said liquid crystal layer being interposed;
a third alignment region provided in said second alignment film and opposed to said first alignment region;
a fourth alignment region provided in said second alignment film and opposed to said second alignment region; and a second electrode arranged opposite to said liquid crystal layer with respect to said second alignment film, said first alignment region and said third alignment region being formed such that liquid crystal molecules located in a central portion between said first alignment region and said third alignment region among said liquid crystal molecules are aligned in a first director orientation when a voltage is applied across said first electrode and said second electrode, said second alignment region and said fourth alignment region being formed such that liquid crystal molecules located in a central portion between said second alignment region and said fourth alignment region among said liquid crystal molecules are aligned in a second director orientation greater in angle of orientation than said first director orientation when a voltage is applied across said first electrode and said second electrode, with a direction toward said boundary line among directions of extension of said first slit portions being defined as a first extension orientation and a direction away from said boundary line among directions of extension of said second slit portions being defined as a second extension orientation, an angle of orientation of said first extension orientation being not greater than an angle of orientation of said first director orientation, an angle of orientation of said second extension orientation being not smaller than an angle of orientation of said second director orientation, and a difference between the angle of orientation of said second extension orientation and the angle of orientation of said second director orientation being greater than a difference between the angle of orientation of said first extension orientation and the angle of orientation of said first director orientation.

2. The liquid crystal display apparatus according to claim 1, wherein
a distance between two end portions of said first slit portion laid out in the direction of extension of said first slit portion is shorter than a distance between two end portions of said second slit portion laid out in the direction of extension of said second slit portion.

3. The liquid crystal display apparatus according to claim 2, wherein
the difference between the angle of orientation of said second extension orientation and the angle of orientation of said second director orientation is not smaller than 15° and smaller than 45°.

4. The liquid crystal display apparatus according to claim 3, wherein
an angle of intersection between said second slit portion and said boundary line is greater than 0° and not greater than 30°.

5. The liquid crystal display apparatus according to claim 4, wherein
the angle of orientation of said first extension orientation and the angle of orientation of said first director orientation substantially match with each other.

6. The liquid crystal display apparatus according to claim 3, wherein
the angle of orientation of said first extension orientation and the angle of orientation of said first director orientation substantially match with each other.

7. The liquid crystal display apparatus according to claim 2, wherein
an angle of intersection between said second slit portion and said boundary line is greater than 0° and not greater than 30°.

8. The liquid crystal display apparatus according to claim 7, wherein
the angle of orientation of said first extension orientation and the angle of orientation of said first director orientation substantially match with each other.

9. The liquid crystal display apparatus according to claim 2, wherein
the angle of orientation of said first extension orientation and the angle of orientation of said first director orientation substantially match with each other.

10. The liquid crystal display apparatus according to claim 1, wherein
the difference between the angle of orientation of said second extension orientation and the angle of orientation of said second director orientation is not smaller than 15° and smaller than 45°.

11. The liquid crystal display apparatus according to claim 10, wherein
an angle of intersection between said second slit portion and said boundary line is greater than 0° and not greater than 30°.

12. The liquid crystal display apparatus according to claim 11, wherein
the angle of orientation of said first extension orientation and the angle of orientation of said first director orientation substantially match with each other.

13. The liquid crystal display apparatus according to claim 10, wherein
the angle of orientation of said first extension orientation and the angle of orientation of said first director orientation substantially match with each other.

14. The liquid crystal display apparatus according to claim 1, wherein
an angle of intersection between said second slit portion and said boundary line is greater than 0° and not greater than 30°.

15. The liquid crystal display apparatus according to claim 14, wherein
the angle of orientation of said first extension orientation and the angle of orientation of said first director orientation substantially match with each other.

16. The liquid crystal display apparatus according to claim 1, wherein
the angle of orientation of said first extension orientation and the angle of orientation of said first director orientation substantially match with each other.

17. A liquid crystal display apparatus, comprising:
a liquid crystal layer containing a plurality of liquid crystal molecules;
a first alignment film arranged to be adjacent to said liquid crystal layer;
a first alignment region provided in said first alignment film, for aligning said liquid crystal molecules;
a second alignment region provided in said first alignment film and arranged to be adjacent to said first alignment region, for aligning said liquid crystal molecules;
a first electrode arranged opposite to said liquid crystal layer with respect to said first alignment film;
a first slit portion formed in said first electrode so as to be opposed to a portion of said first alignment region adjacent to a boundary line between said first alignment region and said second alignment region, and extending in a direction away from said boundary line;

a second slit portion formed in said first electrode so as to be opposed to a portion of said second alignment region adjacent to said boundary line, and extending in a direction away from said boundary line;

a second alignment film opposed to said first alignment film with said liquid crystal layer being interposed;

a third alignment region provided in said second alignment film and opposed to said first alignment region;

a fourth alignment region provided in said second alignment film and opposed to said second alignment region; and a second electrode arranged opposite to said liquid crystal layer with respect to said second alignment film, said first alignment region and said third alignment region being formed such that liquid crystal molecules located in a central portion between said first alignment region and said third alignment region among said liquid crystal molecules are aligned in a first director orientation when a voltage is applied across said first electrode and said second electrode, said second alignment region and said fourth alignment region being formed such that liquid crystal molecules located in a central portion between said second alignment region and said fourth alignment region among said liquid crystal molecules are aligned in a second director orientation greater in angle of orientation than said first director orientation when a voltage is applied across said first electrode and said second electrode, and a distance between opposing end portions of said first slit portion laid out in a direction of extension of said first slit portion being shorter than a distance between opposing end portions of said second slit portion laid out in a direction of extension of said second slit portion.

18. The liquid crystal display apparatus according to claim 17, wherein a distance between the opposing end portions of said first slit portion laid out in the direction of extension of said first slit portion is greater than 0 μm and not greater than 7.5 μm.

\* \* \* \* \*